United States Patent [19]
Halter et al.

[11] Patent Number: 5,319,705
[45] Date of Patent: Jun. 7, 1994

[54] METHOD AND SYSTEM FOR MULTIMEDIA ACCESS CONTROL ENABLEMENT

[75] Inventors: Bernard J. Halter, Longmont, Colo.; Alphonse M. Bracco, Reston, Va.; Donald B. Johnson, Manassas, Va.; An V. Le, Manassas, Va.; Stephen M. Matyas, Manassas, Va.; Rostislaw Prymak, deceased, late of Dumfries, by Nancy Prymak, administrator; James D. Randall, Herndon, Va.; John D. Wilkins, Somerville, Va.

[73] Assignee: International Business Machines Corporation, Armonk, N.Y.

[21] Appl. No.: 964,324

[22] Filed: Oct. 21, 1992

[51] Int. Cl.$^5$ ............................................. H04L 9/00
[52] U.S. Cl. ......................................... 380/4; 380/21; 380/23; 380/25; 380/29; 380/43; 380/49; 380/50
[58] Field of Search ................... 380/4, 21, 23, 25, 29, 380/43, 49, 50; 340/825.31, 825.34

[56] References Cited

U.S. PATENT DOCUMENTS

| | | | |
|---|---|---|---|
| 4,168,396 | 9/1979 | Best | 380/4 |
| 4,278,837 | 7/1981 | Best | 380/4 |
| 4,433,207 | 2/1984 | Best | 380/4 |
| 4,446,519 | 5/1984 | Thomas | 395/425 |
| 4,658,093 | 4/1987 | Hellman | 380/25 |
| 4,757,534 | 7/1988 | Matyas et al. | 380/25 |
| 4,937,863 | 6/1990 | Robert et al. | 380/4 |
| 4,999,806 | 3/1991 | Chernow et al. | 380/4 X |

Primary Examiner—Bernarr E. Gregory
Attorney, Agent, or Firm—John E. Hoel

[57] ABSTRACT

A method and system are disclosed for securely distributing a plurality of software files from a software distribution processor to a user processor, while selectively enabling the user processor to only use a subset of a lesser plurality of the software files. This is achieved by employing a customer key which includes a clear customer number and a derived portion derived from the customer number. The customer key is transformed into a second customer key which serves as a key expression for encrypting a file encryption key specifically intended for a respective one of the plurality of files. A plurality of software files can be stored together, for example on a CD-ROM, with each file encrypted under a corresponding file encryption key. The CD-ROM can be distributed to many user processors. When a specific user processor needs to run one of the software files, a request will be transmitted from the user processor to the software distribution processor. In response to that request, an encrypted file encryption key specific for the requested file, will be transmitted to the user processor. This will enable the user processor to decrypt only the requested file from the CD-ROM. All other files on the CD-ROM remain in their encrypted form and cannot be decrypted and used by the file encryption key received from the software distribution processor.

21 Claims, 14 Drawing Sheets

FIG. 6

KGKLCV:

X'0055110003C00000'

KGKRCV:

X'0055110003A00000'

KDCV:

KGK Record:

| flag X'19' | reserved | encrypted key field KGK | control vector field KGKLCV, KGKRCV | reserved |
|---|---|---|---|---|
| 1 byte | 15 bytes | 16 bytes | 16 bytes | 16 bytes |

FIG. 9

KD Record:

| flag X'19' | reserved | encrypted key field KD | control vector field KDCV | reserved |
|---|---|---|---|---|
| 1 byte | 15 bytes | 16 bytes | 16 bytes | 16 bytes |

FIG. 15

| Software | Quantity |
|---|---|
| OS/2 2.0 | 200 |
| OS/2 2.0 ES (Extended Services) | 100 |
| WordPerfect for OS/2 | 500 |
| Program A | 50 |
| Program B | 100 |

FIG. 16

Shrink-Wrapped Package          500

Stamped Medium 501

...

$eKD_i$(File i)          503

...

Paper          502

KC          504
0009735124FF3A02
D52AB99128C8F634

$eKC'(KD)$          505
B25071AD9C7FD3E6

METHOD AND SYSTEM FOR MULTIMEDIA ACCESS CONTROL ENABLEMENT

DESCRIPTION

1. Technical Field

The invention disclosed broadly relates to data processing systems and methods and more particularly relates to cryptographic systems and methods for use in data processing systems to enhance security.

2. Background Art

The following patents and patent applications are related to this invention and are incorporated herein by reference:

W. F. Ehrsam, et al., "Cryptographic Communication and File Security Using Terminals," U.S. Pat. No. 4,386,234, issued May 31, 1983, assigned to IBM Corporation and incorporated herein by reference.

W. F. Ehrsam, et al., "Cryptographic File Security For Single Domain Networks," U.S. Pat. No. 4,238,854, issued Dec. 9, 1980, assigned to IBM Corporation and incorporated herein by reference.

W. F. Ehrsam, et al., "Cryptographic File Security For Multiple Domain Networks," U.S. Pat. No. 4,203,166, issued May 13, 1980, assigned to IBM Corporation and incorporated herein by reference.

R. M. Best, "Cryptographic Decoder for Computer Programs," U.S. Pat. No. 4,433,207, issued Feb. 21, 1984.

R. M. Best, "Crypto Microprocessor that Executes Enciphered Programs," U.S. Pat. No. 4,465,901, issued Aug. 14, 1984.

Richard Johnstone., "Computer Software Security System," U.S. Pat. No. 4,120,030, issued Oct. 10, 1978.

S. M. Matyas, et al., "Code Protection Using Cryptography," U.S. Pat. No. 4,757,534, issued Jul. 12, 1988, assigned to IBM Corporation and incorporated herein by reference.

B. Brachtl, et al., "Controlled Use of Cryptographic Keys Via Generating Stations Established Control Values," U.S. Pat. No. 4,850,017, issued Jul. 18, 1989, assigned to IBM Corporation and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation and incorporated herein by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

A. S. Cutlip-Cohen, et al., "Data processing method to provide a generalized link from a reference point in an on-line book to an arbitrary multimedia object which can be dynamically updated", Ser. No. 07/755,709, Sep. 6, 1991, assigned to IBM Corporation and incorporated herein by reference.

A digital data processing system contains three basic elements: a processor element, a memory element, and an input/output element. The memory element contains addressable software programs and data. The processor element fetches and processes information stored in the memory element. The input/output element, under control of the processor element, communicates with the memory element, storing and retrieving information from the memory element. The input/output element itself can consist of several different types of units capable of supporting multimedia applications, including a video display, light pen, sound synthesizer, microphone, keyboard, mouse, printer, and communication adapter enabling networking communications to take place.

Generation and sales of multimedia programs and data represents a significant business opportunity for companies who sell computing equipment and for companies who sell multimedia programs and data alone. A multimedia application can consist of a multimedia handler program that supports the presentation of one or more multimedia objects, where each multimedia object may be a separate multimedia data file. Many different multimedia objects, or data files, can be linked into a single multimedia presentation, including both text and non-text objects. Non-text objects includes image objects, graphics objects, formatted data objects, font objects, voice objects, video objects, and animation objects. The multimedia handler program provides generalized links to arbitrary multimedia objects, such that the multimedia objects or data files can be updated dynamically. Such dynamic update capability simplifies the creation of a new version or edition of the multimedia presentation. The concept of a generalize link is described in IBM patent application Ser. No. 07/755,709.

Delivery of multimedia programs and data files (termed "software") can be done in several ways. The software can be bundled and sold with the hardware. It can be sold as a separately-priced package, i.e., the software is distributed on a physical medium such as a diskette or tape. It can also be distributed to each customer or user processor from a central software distribution processor via telephone lines, TV-cable, satellite or radio broadcast. More recently, software vendors have expressed an interest in distributing software by using a stamped medium such as a Compact Disk Read Only Memory (CD-ROM) or an Optical Read Only Memory (OROM). A CD-ROM can hold about 600 megabytes of data — enough storage to hold several hundred program or data files. Such a distribution mechanism is particularly attractive, since production costs decrease significantly with higher volumes. However, when software is distributed over an open channel (e.g., telephone lines, TV-cable, satellite or radio broadcast) or via a high-density stamped medium (e.g., CD-ROM or OROM), much software is literally "put into the hands" of tens or hundreds of thousands of others who did not request the software and who have no need or wish to see the software, but who now have easy access to the software and who may be tempted to violate licence and copyright restrictions. The net expected result of such violations is a loss of revenues to software authors, publishers, and vendors. Thus, the distribution of software over an open channel or via a high-density stamped medium creates a problem quite unique and different from the more traditional problem of unauthorized copying and use of software. Although this is not the problem addressed by the present invention, it is nevertheless described herein in order to contrast the present invention with more traditional software protection methods existing in the prior art.

The prior art describes various systems for enciphering digital information to improve the security and privacy of data transmitted over communications networks. Such data may be messages transmitted during a communication session between two encryption processors or it may be data contained in a data file transmitted from a sending processor to a receiving processor. Such data files can contain executable programs as well as pure data. Examples of file encryption systems can be found in U.S. Pat. Nos. 4,386,234, 4,238,854, and 4,203,166 to Ehrsam et al. In all cases, once an encrypted file is decrypted the programs or data contained in the file must be protected using more traditional access control methods. However, such access control methods do not prevent one user from sharing decrypted programs and data with other users.

The problem of unauthorized copying and use of programs has been addressed by the prior art. U.S. Pat. No. 4,120,030 to Johnstone discloses a computer software security system wherein the data address portions of a set of computer instructions are scrambled in accordance with a predetermined cipher key before the instructions are loaded into an instruction memory. The data involved in the program is loaded into a separate data memory at the addresses specified in the original, unscrambled program. An unscrambler circuit, which operates in accordance with the cipher key, is coupled in series with the data memory address input conductors.

U.S. Pat. No. 4,168,396 to Best discloses a microprocessor for executing computer programs which have been enciphered during manufacture to deter the execution of the programs in unauthorized computers. U.S. Pat. No. 4,278,837 to Best discloses a crypto-microprocessor chip that uses a unique cipher key or tables for deciphering a program so that a program that can be executed in one chip cannot be run in any other microprocessor. U.S. Pat. No. 4,433,207 to Best discloses an integrated circuit decoder for providing micro computer users with access to several proprietary programs that have been distributed to users in cipher. The decoder chip can decipher a program when an enciphered key called a "permit code" is presented to the decoder chip.

U.S. Pat. No. 4,446,519 to Thomas discloses a method for providing security for computer software by providing each purchaser of a software package with an electronic security device which must be operatively connected to the purchaser's computer. The software sends coded interrogation signals to the electronic security device which processes the interrogation signals and transmits coded response signals to the software. The programs will not be executed unless the software recognizes the response signals according to preselected security criteria.

U.S. Pat. No. 4,757,534 to Matyas, et al., discloses a cryptographic method for discouraging the copying and sharing of purchased software programs while allowing an encrypted program to be run on only a designated computer or, alternatively, to be run on any computer but only by the user possessing a designated smart card. Each program offering sold by the software vendor is encrypted with a unique file key and then written on a diskette. A user who purchases a diskette having written thereon an encrypted program must first obtain a secret password from the software vendor. This password will allow the encrypted program to be recovered at a prescribed, designated computer having a properly implemented and initialized encryption feature. The encryption feature decrypts the file key of the program from the password, and when the encrypted program is loaded at the proper computer, the program or a portion of it is automatically decrypted and written into a protected memory from which it can only be executed and not accessed for non-execution purposes.

As the reader will see from the cited prior art, the traditional problem of unauthorized copying and use of programs has been to make it hard, or in some cases difficult, to copy part or all of the program once it has been decrypted within the secure cryptographic processor. This can be done by executing the program on the decryption chip itself or by transferring the decrypted program, or a designated portion of the decrypted program, from the secure cryptographic processor to a protected memory it is executed. Problems associated with software distribution over an open channel or using high-density stamped media are overlooked or neglected.

OBJECTS OF THE INVENTION

It is therefore an object of the invention to provide an improved method of multimedia software distribution over an open channel or using high-density stamped media.

It is another object of the invention to provide a cryptographic method for the protection of multimedia program and data files distributed over an open channel or using high-density stamped media.

It is another object of the invention to provide a means for controlling access to multimedia programs and data files distributed over an open channel or using high-density stamped media so that an authorized user can access (i.e., decrypt and recover) files he/she has purchased and licensed but an unauthorized user cannot access (i.e., decrypt and recover) files he/she has not purchased and licensed.

It is another object of the invention to provide a means for using cryptographic keys — consisting of customer and data keys — to control access to encrypted multimedia files.

It is another object of the invention to provide a means for associating and tracing a customer key to a particular customer or user, thereby discouraging users from sharing keys or posting them on a computer bulletin board.

It is another object of the invention to provide a means for tracing customer keys to customers by assigning a unique customer number to each customer and by making the customer number a sub-portion of the clear customer key.

It is another object of the invention to provide a means whereby encrypted multimedia files cannot be decrypted except at a user processor with a capability for multimedia file recovery, as specified by the invention. That is, an encrypted file and the keys needed for decrypting the file are not, by themselves, enough to decrypt the file.

It is another object of the invention to provide a multimedia file recovery procedure that makes use of a copyright-protected function which is new and unique to the file recovery procedure (i.e., the function does not exist in any book or printed literature to which a user can easily be directed), which is complex (i.e., one cannot easily provide a written description of the function except by directly copying it), and which is of modest size (i.e., if the function is copied, and possibly posted on a computer bulletin board, it will be conspicuous because of its size).

It is another object of the invention to provide a means for cryptographic keys to be self-authenticating based on authentication information stored within the keys themselves. This will help to minimize cases of incorrectly initialized keys and incorrectly decrypted files.

It is another object of the invention to provide a key management scheme that supports software distribution from both a central software distribution facility and from merchants who contract with the software vendor and receive the necessary pre-calculated keys to be given to customers who purchase multimedia software.

SUMMARY OF THE INVENTION

These and other objects, features, and advantages are accomplished by the invention disclosed herein.

Unlike much of the prior art, the present invention does not solve, or attempt to solve, the traditional problem of unauthorized copying and use of programs. That is, the invention does not solve the problem of copying software once it has been received and decrypted at a user processor. An assumption is made that ordinary software licences and copyright protection law are sufficient to deter such unauthorized copying and use of programs once they have been received and decrypted.

Instead, the invention describes a cryptographic means for protecting software distributed over an open channel or via a high-density stamped medium. For software files purchased by a user, the method provides an easy means to decrypt and recover the software files at a user processor. The method is based on the use of encryption keys issued to the user by the software distribution processor. These encryption keys, when initialized in the user processor, enable file recovery to take place. The method is also such that it is difficult for a user to circumvent security and decrypt an encrypted file without possessing a customer-unique key (called a customer key) and without possessing the correct encrypted file key needed to "unlock" or decrypt the encrypted file.

Each multimedia file is encrypted with a secret data key (KD). The same data key can encrypt multiple files if there is some logical association of the files (e.g., files are grouped and sold as a unit).

The encrypted files are distributed over an open channel or via high-density stamped media. Those skilled in the art will recognize that the invention is not limited to only these two methods of software distribution, but that the invention is aimed at solving a problem particular to these two methods of software distribution.

Each customer who purchases multimedia software is given a unique customer key. The customer key contains a customer-unique customer number, which is assigned and provided to the customer using means outside the scope of the present invention. The invention permits multiple customer numbers and customer keys to be provided to a single customer. For example, a large customer like General Motors may have many customer numbers, so that software orders can be placed by many groups or areas within a single large corporation or business.

When a customer purchases multimedia software from a software distribution facility, the customer provides his/her customer number. The customer key is produced from a set of variables consisting of an assigned customer number, a counter (arbitrarily set to zero), and a secret key-generating key (KGK) known only to the software distribution center. A special copyright-protected function (f) is then used to derive a variant customer key (KC') from the customer key. The data key(s) associated with the multimedia file(s) purchased by the customer are then encrypted with the variant customer key. The clear customer key and the encrypted file key(s) are provided to the customer (e.g., transmitted electronically from the software distribution processor to the user processor, written on a diskette and mailed to the customer, or orally transmitted over a telephone). At the user processor, the keys and encrypted file(s) are initialized and made available to the file recovery program. The file recovery program decrypts and recovers the file(s). When a customer purchases additional software, he/she will receive one or more encrypted data keys to permit the encrypted files to be recovered. As the clear customer key will be the same as before, a clear customer key may or may not be provided. The system will be able to recover the previously entered customer key to avoid having the user being required to re-enter it. Alternately, the user can enter it, as desired.

When software is purchased from an independent merchant, the customer will receive a pre-generated customer key issued in advance to the merchant. The pre-generated customer keys are supplied to the merchant by the software distribution center (e.g., IBM software distribution center). For example, a merchant who orders 200 OS/2 licenses would receive 200 CD-ROMs and 200 shrink-wrapped license packets. Each license packet would have a sheet of paper with a customer key printed on it. The customer keys given to each merchant are produced from a set of variables consisting of an assigned customer number given to the merchant, an incrementing counter associated with the merchant, and a secret key-generating key. When the keys are generated for a merchant, the counter is incremented for each license issued and thus, the merchant would receive 200 different customer keys. In this case, the software distribution center must only keep track of the number of keys issued to each merchant. The merchant's customer number, at the front of the customer key, would be the same for each generated key.

BRIEF DESCRIPTION OF THE DRAWINGS

These and other objects, features, and advantages of the invention will be more fully appreciated with reference to the accompanying figures.

FIG. 6 contains a specification for the control vectors KGKLCV and KGKRCV associated with the left and right 64-bit parts of key-generating key KGK.

FIG. 7 is a block diagram illustration of a KGK record.

FIG. 9 is a block diagram illustration of a KD-record.

FIG. 15 is an example list of software to be purchased from a software vendor.

FIG. 16 is an illustration of a shrink wrapped package containing a stamped medium and a piece of paper on which is printed a clear customer key KC and an encrypted ith file key e*KC'(KDi), where KC' is the variant customer key produced from KC.

DESCRIPTION OF THE BEST MODE FOR CARRYING OUT THE INVENTION

The invention describes a method for multimedia software distribution in situations where a user purchases software directly from a software vendor or where a user purchases software from an independent merchant who purchases the software from a software vendor.

Figure 1:
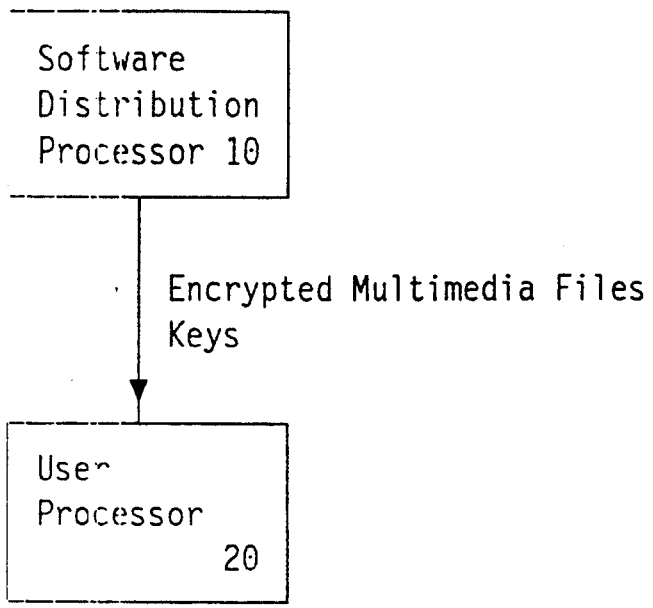
FIG. 1 is a block diagram illustrating multimedia software distribution from a software distribution processor to a user processor.

FIG. 1 is a block diagram illustrating multimedia software distribution from a software distribution processor 10 belonging to a software vendor such as IBM to a user processor 20 belonging to a user. The purchased/licensed multimedia software is distributed as one or more encrypted multimedia files and a set of cryptographic keys that permit the encrypted multimedia files to be decrypted and recovered at the user processor.

Figure 2:
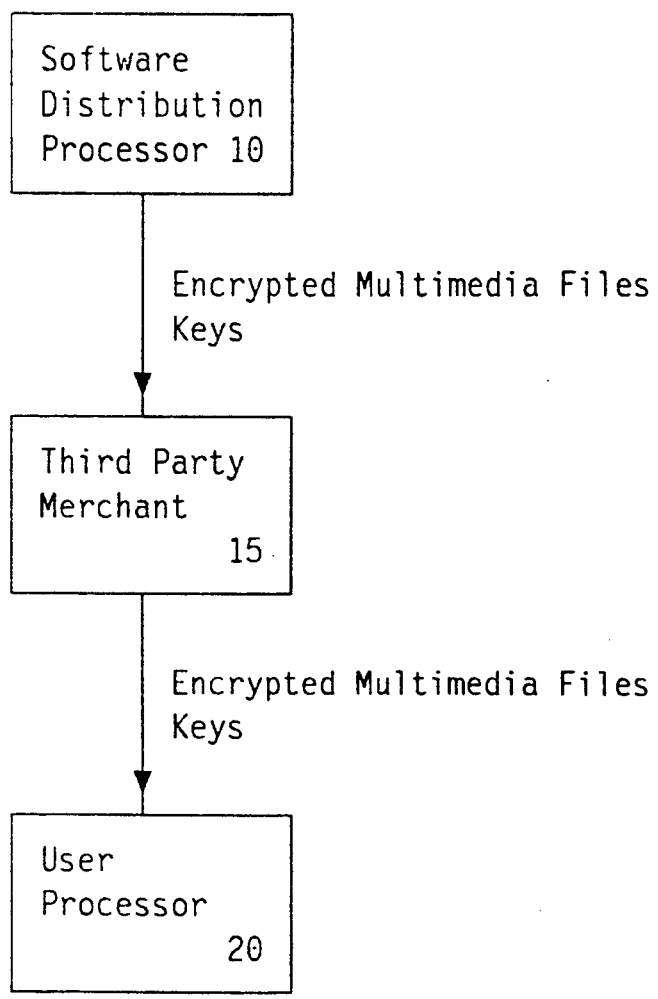
FIG. 2 is a block diagram illustrating multimedia software distribution from a software distribution processor to a merchant processor and from the merchant processor to a user processor.

FIG. 2 is a block diagram illustrating multimedia software distribution from a software distribution processor 10 belonging to a software vendor to a third party merchant 15 and thence from the third party merchant 15 to a user processor 20 belonging to a user. In this case, the merchant purchases software from the software vendor at a wholesale price for subsequent re-sale to users at a retail price. The merchant is a customer of the software vendor and the user is a customer of the merchant.

Figure 3:
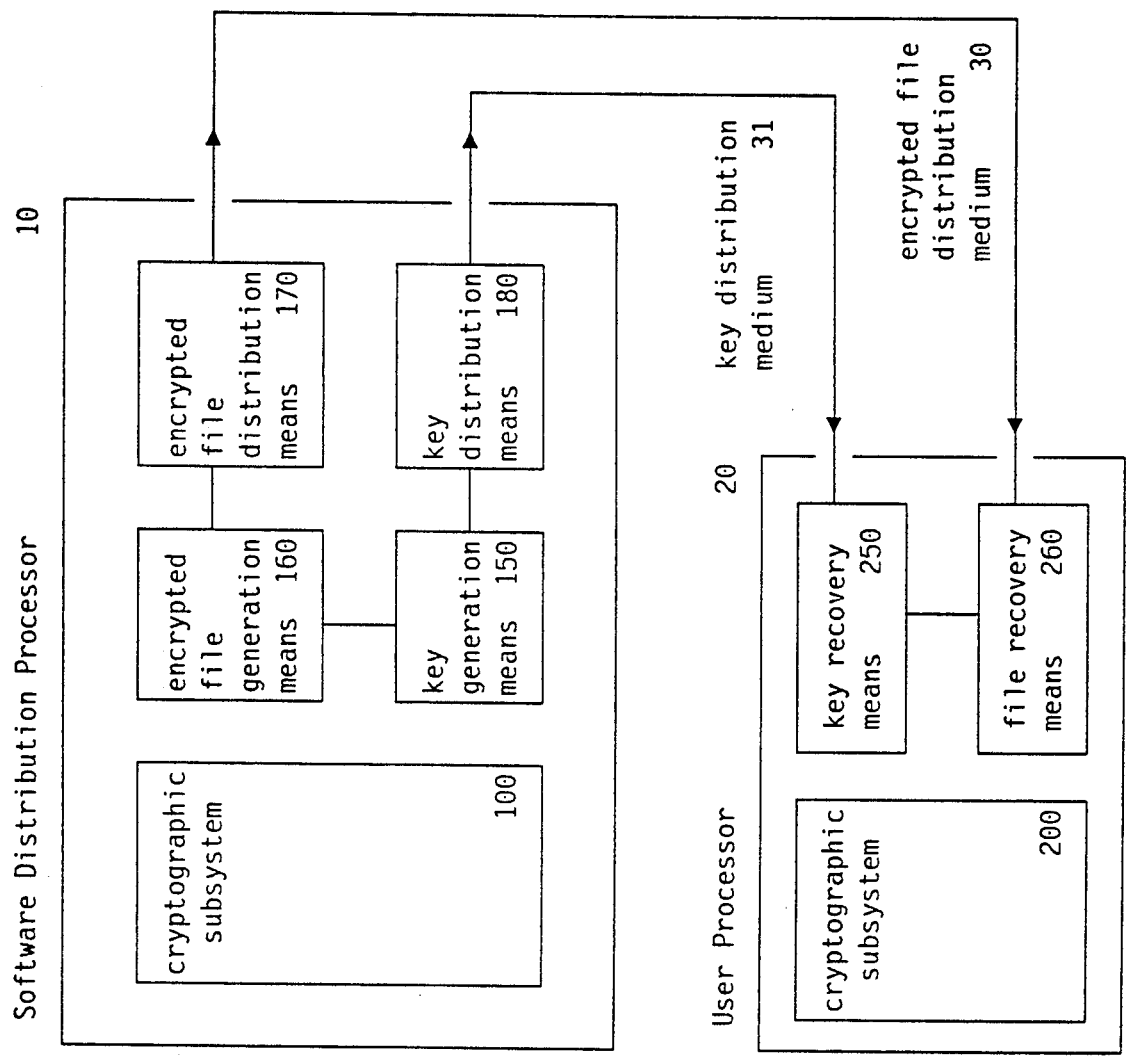
FIG. 3 is a block diagram further amplifying and illustrating multimedia software distribution from a software distribution processor belonging to a software vendor to a user processor belonging to a user.

FIG. 3 is a block diagram further amplifying and illustrating multimedia software distribution from a software distribution processor 10 belonging to a software vendor (e.g., IBM) to a user processor 20 belonging to a user. The multimedia programs and files distributed via this method shall be referred to as files or multimedia files. Software distribution processor 10 contains a cryptographic subsystem 100 for performing data encryption and other key management services, a key generation means 150 for generating keys, an encrypted file generation means 160 for encrypting files, an encrypted file distribution means 170 for packaging and transmitting encrypted files, and a key distribution means 180 for packaging and transmitting keys. Keys generation means 150 invokes cryptographic subsystem 100 to execute key management services. File encryption means 160 invokes cryptographic subsystem 100 to encrypt files. User processor 20 contains a comparable cryptographic subsystem 200 for performing data decryption and other key management services, a key recovery means 250 for validating and decrypting keys, and a file recovery means 260 for decrypting encrypted files. Key recovery means 250 invokes cryptographic subsystem 200 to execute key management services. File recovery means 260 invokes cryptographic subsystem 200 to decrypt files. Encrypted files are distributed from software distribution processor 10 to user processor 20 using an encrypted file distribution medium 30. Cryptographic keys are distributed from software distribution processor 10 to user processor 20 using a key distribution medium 31.

Referring again to FIG. 3, a file is encrypted at software distribution processor 10 by first requesting a data key from key generation means 150. A data key is generated by invoking a cryptographic service provided by cryptographic subsystem 100. In response, key generation means 150 generates a data key — a copy of which is delivered to encrypted file generation means 160 and a copy of which is saved within key generation means 150 for subsequent use by key distribution means 180. The so-generated data key is next used by encrypted file generation means 160 to encrypt the specified file, which is saved within encrypted file generation means 160 for subsequent use by encrypted file distribution means 170. Data is encrypted by invoking a cryptographic service provided by cryptographic subsystem 100. If encrypted file distribution medium 30 is a high-density stamped medium such a CD-ROM, then encrypted file distribution means 170 includes methods for the production and distribution of CD-ROMs. For example, CD-ROM production would include the steps of selecting a set of files, causing the files to be encrypted using encrypted file generation means 160, and manufacturing CD-ROM copies for distribution. CD-ROMs can be distributed using the U.S. postal service or similar delivery service such as Federal Express, or they can be shipped to selected distribution points where they are picked up by customers. If encrypted file distribution medium 30 is an open channel, the encrypted file distribution means 170 transmits the so-produced encrypted files via the open channel (telephone lines, TV-cable, satellite or radio broadcast) according to a pre-arranged schedule prepared by the software vendor. In any case, encrypted file distribution means 170 ensures that encrypted files are distributed to customers in an efficient and timely manner.

In response to a customer order for multimedia software (consisting of one or more multimedia files) key generation means 150 produces a unique customer key from information including a unique customer number supplied by the customer. A customer key is generated by invoking a cryptographic service provided by cryptographic subsystem 100. Key generation means 150 next produces a variant customer key from the so-produced customer key. The so-produced variant customer key is then used to encrypt one or more data keys. A data key is encrypted with a system-generated variant customer key by invoking a cryptographic service provided by cryptographic subsystem 100. The data keys encrypted with the variant customer key are the data keys associated with the purchased files, i.e., the data keys that were originally used to encrypt said purchased files. The so-produced customer key and the so-produced encrypted data keys are provided to key distribution means 180, which in turn transmits the keys to user processor 20 using key distribution medium 31. Key distribution medium 31 can be a communications channel permitting the key to be electronically transmitted from software distribution processor 10 to user processor 20. Key distribution medium 31 can be a diskette permitting the keys to be delivered via the U.S. postal service or similar delivery service such as Federal Express. Key distribution medium 31 can be a telephone connection permitting the keys to be delivered orally to the user. In the preferred embodiment of the invention, keys are delivered using automatic means which do not require users to write keys down on paper or to enter keys using a key-pad. However, such manual key handling techniques are not precluded by the invention, and those who wish to practice the invention in this way can do so.

For each encrypted file transmitted via file distribution medium 30, there is an encrypted data key transmitted via key distribution medium 31. A file identifier is also transmitted together with each encrypted data key, thus permitting an encrypted data key to be correctly associated with its respective encrypted file. A data key can be associated with one or more encrypted files depending on whether the multimedia software consists of a single multimedia file or whether it is a entire product consisting of several multimedia files. The reader will appreciate that the file identifier is not a crucial element of the subject invention and also that there are many ways in which the file identifier can be defined in a practical implementation of the subject invention.

At user processor 200, key and file recovery takes place as follows. Key recovery means 250 first authenticates the customer key and each encrypted data key received via key distribution medium 31. Keys are authenticated by invoking cryptographic services provided by cryptographic subsystem 200. A key is discarded and not used if it fails to be authenticated, although it shall be assumed here that the key authentication step succeeds. For each encrypted file to be recovered, the file identifier associated with the encrypted file is used to identify an encrypted data key to be decrypted. This so-identified encrypted data key received via key distribution medium 31 is decrypted via key recovery means 250 using a variant customer key produced from customer key received via key distribution medium 31. Data keys are decrypted by invoking a cryptographic service provided by cryptographic subsystem 200. The so-recovered clear data key is provided to file recovery means 260 which then uses the key to decrypt the encrypted file received via file distribution medium 30. Data is decrypted by invoking a cryptographic service provided by cryptographic subsystem 200. The so-recovered file is provided to user processor 20. The process of file recovery thus proceeds until each encrypted file is decrypted. The reader will appreciate that the file recovery process can be performed as a single batch operation wherein each of the encrypted files received via file distribution medium 30 is decrypted and provided to user processor 20 as a unit. Conversely, the file recovery process can occur in a more dynamic manner in which a file is recovered when access to the file is needed. In this case, the recovered file can be stored in clear form within user process 20 so that subsequent requests for the file will result in accessing the clear stored copy of the file. Likewise, it is possible to discard the recovered file once it has been used so that subsequent requests for the file will cause the file recovery process to re-invoked (i.e., the data key is decrypted and the file is decrypted again with the clear data key). The informed reader will appreciate that there are many ways in which file recovery can be performed without departing from the spirit of the subject invention.

Figure 4:
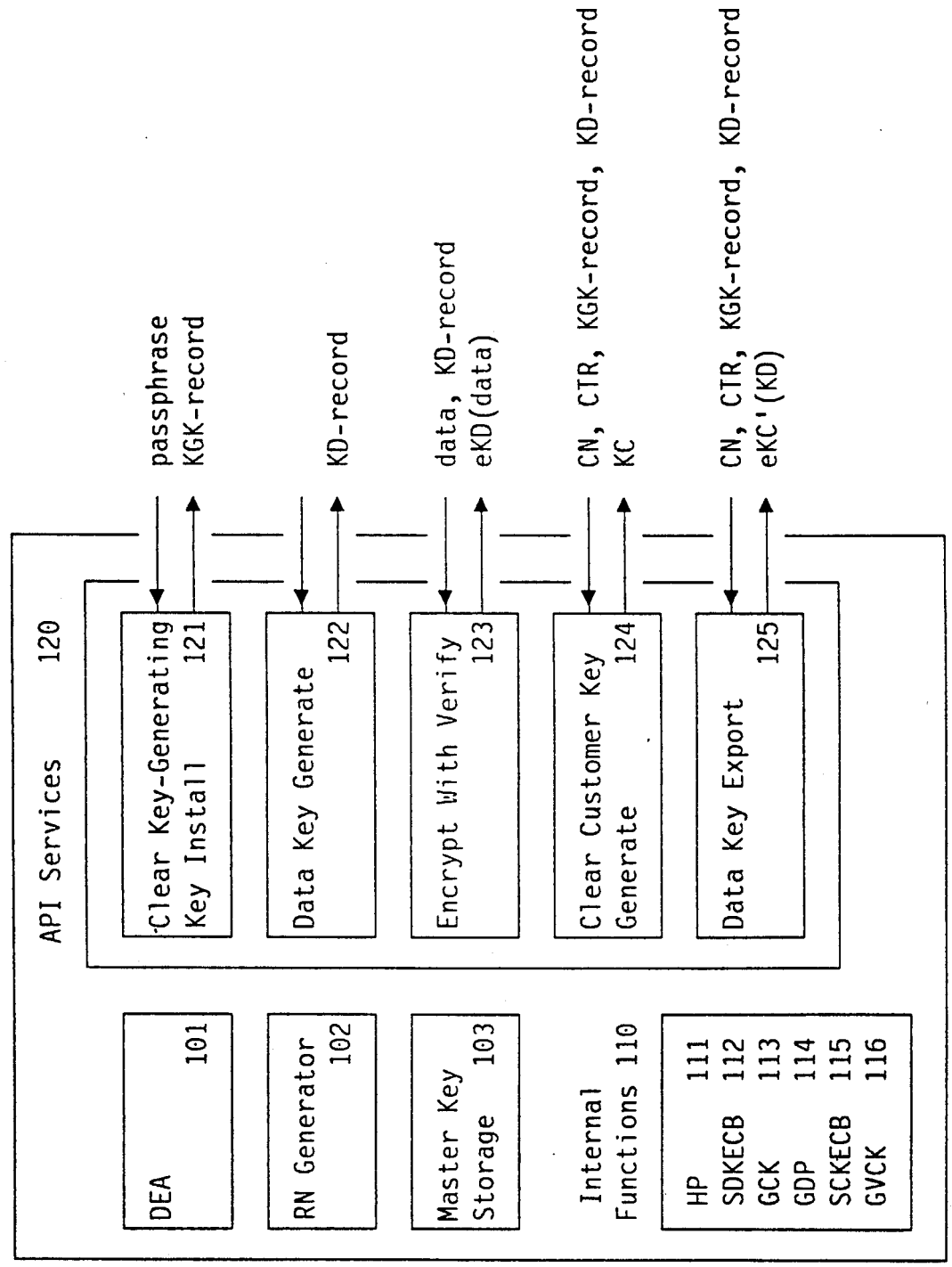
FIG. 4 is a block diagram illustration of cryptographic subsystem 100 at software distribution processor 10.

FIG. 4 is a block diagram illustration of cryptographic subsystem 100. Cryptographic subsystem 100 contains a Data Encryption Algorithm (DEA) 101 capable of performing elementary operations of encryption and decryption, a random number (RN) generator 102 for generating 64-bit random numbers used in the process of key generating, a master key storage 103 for the storage of a 128-bit master key (KM), a set of API-callable services 120 for performing data encryption and key management functions required by the software distribution processor 10, and a set of internal functions 110 which are called by the API services and which eliminate processing redundancies within and maintain consistency across the set of API-callable services 120.

The DEA 101 contains a copy of the Data Encryption Algorithm (DEA). The DEA is a block cipher that encrypts a 64-bit plaintext with a 64-bit key to produce a 64-bit ciphertext. The notation eK(X) denotes encryption of 64-bit plaintext X with 64-bit key K. The notation e*K(X) denoted the encryption of 64-bit plaintext X with 128-bit key K, i.e., the asterisk ("*") denotes encryption with a doubled length key. Of the 64 bits in the key, 56 bits are independent key bits. The remaining 8 non-key bits (7, 15, 23, 31, 39, 47, 55, 63) may be used for parity error checking purposes. For example, bit 7 is set so that byte 1 has odd parity, bit 15 is set so that byte 2 has odd parity, etc.

Random number generator 102 may be a true random number generator or a pseudorandom number generator. This distinction is unimportant to the present invention.

In the present invention, master key storage 103 contains a fixed constant master key. However, those skilled in the art will recognize that provision can easily be made for the master key to be a variable initialized in the cryptographic subsystem, e.g., by manual key entry through a cable-attached keypad. Such a method of master key entry is described in U.S. Pat. No. 4,941,176 to Matyas et al.

The API Services 120 include Clear Key-Generating Key Install 121, Data Key Generate 122, Encrypt With Verify 123, Clear Customer Key Generate 124, and Data Key Export 125. Those skilled in the art will recognize that cryptographic subsystem 100 can contain other API services such as a Cryptographic Sub-system Initialize service for initializing the cryptographic subsystem prior to its use, a Master Key Update service allowing a master key to be initialized or changed within the cryptographic subsystem, and a Verification Data Encrypt service for calculating a very high-integrity verification value to be used at a user processor for authenticating a data key before it is used for decrypting data. While such services enhance the utility of the cryptographic subsystem, they are not a crucial part of the subject invention. The Internal Functions 110 include Hash Passphrase (HP) 111, Set Data Key Error Checking Bits (SDKECB) 112, Generate Customer Key (GCK) 113, Generate Derived Part (GDP) 114, Set Customer Key Error Checking Bits (SCKECB) 115, and Generate Variant Customer Key (GVCK) 116.

Referring again to FIG. 4, the Clear Key-Generating Key Install function 121 produces a 128-bit key-generating key (KGK) from a 1 to 80 character input passphrase using the Hash Passphrase (HP) internal function 111. The HP function consists of the following steps:

1. Set X1:=passphrase
2. Pad X1 (on the right) with enough space characters to make X1 80 characters in length.
3. Encrypt X1 with key X'0101010101010101' and initial chaining value X'0000000000000000' using CBC mode of DEA encryption. The CBC mode of encryption is described in detail in U.S. Pat. No. 4,918,728 to Matyas et al.
4. Set KGKL:=rightmost 8 bytes of X1.
5. Set X2:=passphrase
6. Pad X2 (on the right) with enough space characters to make X2 80 characters in length.
7. Encrypt X2 with key X'1010101010101010' and initial chaining value X'0000000000000000' using CBC mode of DEA encryption.
8. Set KGKR:=rightmost 8 bytes of X2.
9. Set KGK:=concatenation of KGKL and KGKR
10. Adjust KGK for odd parity (i.e., counting bits as 0, 1, ..., 127, set bit 7 so that bits 0, 2, ..., 7 have an odd number of 1 bits, set bit 15 so that bits 8, 9, ..., 15 have an odd number of 1 bits, and so forth.
11. Return KGK as the output key-generating key.

Figure 5:
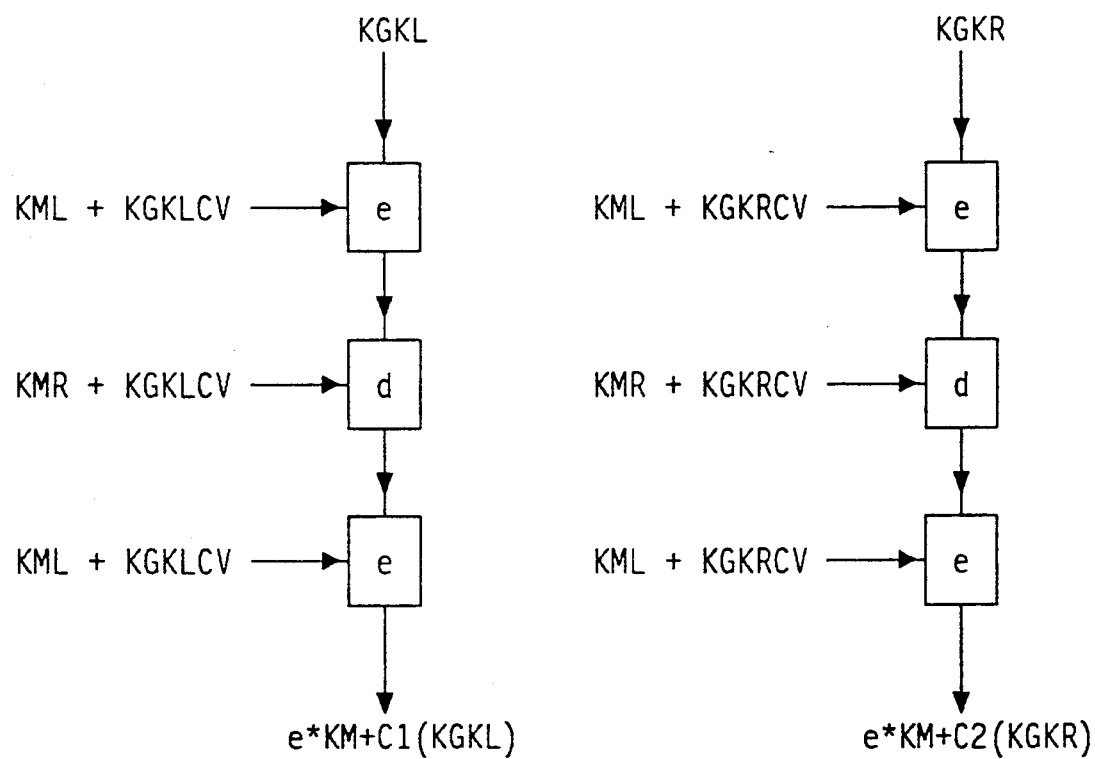
FIG. 5 is a block diagram illustration of the method for encrypting a key-generating key using a variant key produced from the master key KM and a control vector associated with the key-generating key.

The so-produced key-generating key KGK is encrypted with a variant key produced from the master key and a control vector associated with the key-generating key, as illustrated in FIG. 5. Referring to FIG. 5, the left 64-bit part (KGKL) of key-generating key KGK is encrypted with variant keys KML+KGKLCV and KMR+KGKLCV, where KML+KGKLCV is the Exclusive OR product of the left 64-bit part of master key KM and KGKLCV is a 64-bit control vector associated with the left 64 bits of key-generating key KGK and KMR+KGKLCV is the Exclusive OR product of the right 64-bit part of master key KM and KGKLCV is a 64-bit control vector associated with the left 64-bits of key-generating key KGK. The process of encryption consists of encrypting KGKL with KML+KGKLCV, decrypting the result with KMR+KGKLCV, and then encrypting that result with KML+KGKLCV. The right 64-bit part (KGKR) of key-generating key KGK is encrypted with variant keys KML+KGKRCV and KMR+KGKRCV, where KML+KGKRCV is the Exclusive OR product of the right 64-bit part of master key KM and KGKRCV is a 64-bit control vector associated with the right 64 bits of key-generating key KGK and KMR+KGKRCV is the Exclusive OR product of the right 64-bit part of master key KM and KGKRCV is a 64-bit control vector associated with the right 64-bits of key-generating key KGK. The process of encryption consists of encrypting KGKR with KML+KGKRCV, decrypting the result with KMR+KGKRCV, and then encrypting that result with KML+KGKRCV. FIG. 6 contains a specification for the control vectors KGKLCV and KGKRCV associated with the left and right 64-bit parts of key-generating key KGK. The control vector values are fixed constants stored within cryptographic subsystem 100, although they are not shown in FIG. 4. The so-encrypted key-generating key is stored in a KGK-record, which is returned as an output. FIG. 7 is a block diagram illustration of a KGK-record. A KGK-record consists of a 1-byte flag (=X'19'), a 15-byte reserved field, a 16-byte key field containing the 128-bit encrypted key-generating key, a 16-byte control vector field containing an 8-byte control vector associated with KGKL (i.e., with the left 64 bits of KGK) concatenated with an 8-byte control vector associated with KGKR (i.e., with the right 64 bits of KGK), and a 16-byte reserved field.

The Data Key Generate function 122 produces a 64-bit encrypted data key which is stored in a data key record (KD-record) and returned as an output. The 64-bit data key is produced by requesting a 64-bit random number (RN) from RN generator 102 and then setting the error checking bits in random number (RN) using the Set Data Key Error Checking Bits (SDKECB) internal function 112. The input to the SDKECB function is a 64-bit random number RN; the output is a 64-bit data key with its error checking bits set. The SDKECB function consists of the following steps:

1. Set K:=RN AND X'FEFEFEFEFEFEFEFE'
2. Set MAC:=64-bit message authentication code calculated on K using a fixed key of X'0123456789ABCDEF'. The message authentication code, in this case, is the 64-bit ciphertext produced by encrypting the plaintext K with the key X'0123456789ABCDEF'. The procedure or algorithm for calculating 64-bit message authentication codes is described in U.S. Pat. No. 4,918,728 to Matyas et al.
3. Set Z:=MAC AND X'0101010101010101'
4. Set KD:=K XOR Z
5. Return KD as the output data key.

Figure 8:
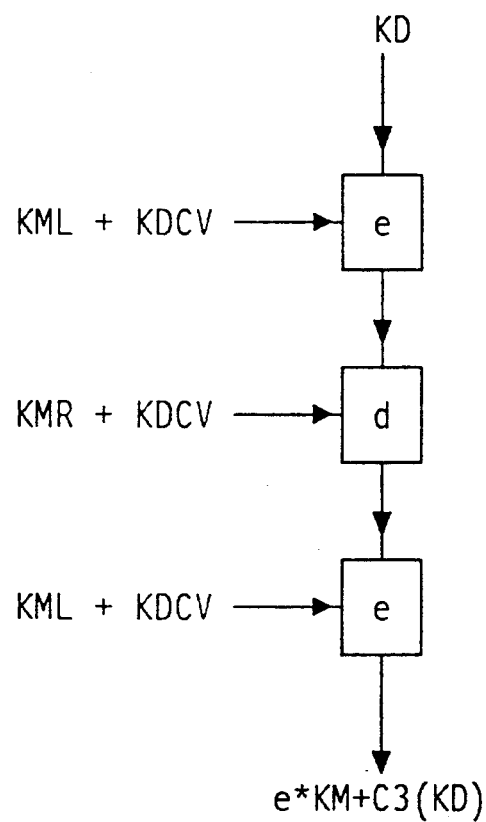
FIG. 8 is a block diagram illustration of the method for encrypting a data key using a variant key produced from the master key KM and a control vector associated with the data key.

Note that the "AND" operation is a bitwise operation where B'0' AND B'0'=B'0', B'0' AND B'1'=B'0', B'1' AND B'0'=B'0', AND B'1'=B'1'. Note that "XOR" represents the Exclusive OR operation, or bitwise addition modulo 2. The so-produced data key is encrypted with a variant key produced from the master key and a control vector associated with the data key, as illustrated in FIG. 8. Referring to FIG. 8, KD is encrypted with variant keys KML+KDCV and KMR+KDCV, where KML+KDCV is the Exclusive OR product of the left 64-bit part of master key KM and KDCV is a 64-bit control vector associated with KD and KMR+KDCV is the Exclusive OR product of the right 64-bit part of master key KM and KDCV is a 64-bit control vector associated KD. The process of encryption consists of encrypting KD with KML+KCDV, decrypting the result with KMR+KDCV, and then encrypting that result with KML+KDCV. FIG. 6 contains a specification for the control vector KDCV associated with the data key KD. FIG. 9 is a block diagram illustration of a KD-record. A KD-record consists of a 1-byte flag (=X'19'), a 15-byte reserved field, a 16-byte key field containing an 64-bit encrypted data key, a 16-byte control vector field containing an 8-byte control vector associated with KD, and a 16-byte reserved field.

The Encrypt With Verify function 123 encrypts input data with a data key contained in an input data key record (KD-record) to produce encrypted data of the form eKD(0, data), 0 represents an initial chaining value and data represents data of consisting of 64-bit blocks. Data is encrypted with the Cipher Block Chaining (CBC) mode of DEA encryption using an initial chaining value (or initilization vector) of zero. The CBC mode of encryption is described in detail in U.S. Pat. No. 4,918,728 to Matyas et al. Before the data key KD can be used, it must be retrieved from the input KD-record and decrypted. The encrypted data key is decrypted with a variant key produced from the master key and a control vector associated with the data key. The decryption process is the inverse of the encryption process shown in FIG. 8. That is, the encrypted value of KD is decrypted with KML+KDCV, the result is encrypted with KMR+KDCV, and that result is decrypted with KML+KDCV to recover KD. The process of encrypting the input data consists of the steps of (1) encrypting the data with KD, (2) decrypting the encrypted data with KD, (3) comparing the decrypted data with the original data for equality, and (4) returning the encrypted data as an output only if the comparison operation in step 3 succeeds. This sort of verification on the data is performed as a preventative measure to reduce the chance that one is unable to decrypt encrypted data on a CD-ROM. It would be unfortunate if one discovered that encrypted data on a CD-ROM could not be decrypted after tens or hundreds of thousands of CD-ROM copies had been produced.

The Clear Customer Key Generate function 124 produces a clear 128-bit customer key from a 10 decimal digit customer number, a 32-bit counter value CTR, and a key-generating key contained in a KGK-record, all of which are supplied as inputs to the function. The process of generating a clear customer key consists of the following steps:

1. Retrieve the encrypted value of KGK from the input KGK-record and decrypt it with the master key. The encrypted value of KGK is decrypted with a variant key produced from the master key and a control vector associated with KGK. The decryption process is the inverse of the encryption process shown in FIG. 5.
2. Set KC:=128-bit value produced by the Generate Customer Key (GCK) internal function 113, where the inputs to the GCK function are the 10 decimal digit customer number, the 32-bit counter, and the 128-bit KGK recovered at step 1 above.
3. Return KC as the output customer key.

The Generate Customer Key (GCK) function 113 produces a 128-bit customer key from a 10 decimal digit customer number, a 32-bit counter CTR, and a 128-bit key-generating key KGK. The GCK function consists of the following steps:

1. convert each decimal digit of the customer number to a 4-bit "nibble" (i.e., 0=B'0000', 1=B'0001', 2=B'0010', etc.), concatenate the 10 4-bit "nibbles", and store the 40-bit value as CN.
2. Set KCL:=concatenation of CN, CTR, X'FF', and X'0000', where CTR is the 32-bit input counter value.
3. Set KCR:=intermediate 64-bit value DP produced by the Generate Derived Part (GDP) function 114 using CN, CTR, and KGK as function inputs.
4. Set KC:=128-bit value produced by the set Customer Key Error Checking Bits (SCKECB) function 115, where the input to the SCKECB function is the 128-bit value of key_in produced as the concatenation of KCL (produced at step 2 above) and KCR (produced at step 3 above).
5. Return KC as the output customer key.

The Generate Derived Part (GDP) function 114 generates a 64-bit intermediate value DP from a 40-bit customer number CN, a 32-bit counter CTR, and a 128-bit key-generating key KGK. The intermediate value DP is used in the production of a customer key. The GDP function 114 consists of the following steps:

1. Set X1:=the value of CN padded on the right with zero bits to make a 64-bit block.
2. Set X2:=the value of CTR padded on the left with zero bits to make a 64-bit block.
3. Set X:=concatenation of X1 and X2.
4. Set Y:=final 64-bit block of ciphertext produced by encrypting X with KGL (i.e., the leftmost 64-bits of KGK) and initial chaining value X'0000000000000000' using CBC mode of DEA encryption.
5. Set DP:=value produced by decrypting Y with KGR (i.e., the rightmost 64-bits of KGK) and encrypting that result with KGL (i.e., the leftmost 64-bits of KGK).
6. Return the derived part DP as an output.

The Set Customer Key Error Checking Bits (SCKECB) function 115 sets the error checking bits in a 128-bit customer key. The input to the SCKECB function is a 128-bit value called key_in, which is an intermediate value produced by the Clear Customer Key Generate function; the output is a 128-bit customer key KC with its error checking bits set. The SCKECB function consists of the following steps:

1. Set K:=key_in AND X'FFFFFFFFFFFF0000FEFEFEFEFEFEFEFE'.
2. Set MAC:=64-bit message authentication code calculated on K using a fixed key of X'0123456789ABCDEF'. The procedure for calculating a message authentication code is described in U.S. Pat. No. 4,918,728 to Matyas et al.
3. Set Y:=MAC AND X'000000000000FFFF'.
4. Set KL':=KL XOR Y, where KL is the leftmost 64 bits of K.
5. Set MAC':=value produced by encrypting MAC with key X'0123456789ABCDEF' using Electronic Code Book (ECB) mode of DEA encryption. The ECB mode of DEA encryption is described in U.S. Pat. No. 4,918,728 to Matyas et al.
6. Set Z:=MAC' AND X'0101010101010101'.
7. Set KR':=KR XOR Z, where KR is the rightmost 64 bits of K.
8. Set KC:=concatenation of KL' and KR'.
9. Return KC as the output customer key.

Note that "AND" represents a bitwise operation where B'0' AND B'0'=B'0', B'0' AND B'1'=B'0', B'1' AND B'0'=B'0', and B'1' AND B'1'=B'1'. Note that "XOR" represents the Exclusive OR operation, or bitwise addition modulo 2.

The Data Key Export function 125 produces an encrypted data key of the form e*KC'(KD) — defined as the encryption of KD with a 128-bit variant customer key KC' — from a 10 decimal digit customer number, a 32-bit counter, a 128-bit key-generating key contained in a 64-byte KGK-record, and a 64-bit data key contained in a 64-byte KD-record. The process of generating e*KC'(KC) consists of the following steps:

1. Retrieve the encrypted value of KGK from the input KGK-record and decrypt it with the master key. The encrypted value of KGK is decrypted with a variant key produced from the master key and a control vector associated with KGK. The decryption process is the inverse of the encryption process shown in FIG. 5.

2. Retrieve the encrypted value of KD from the input KD-record and decrypt it with the master key. The encrypted value of KD is decrypted with a variant key produced from the master key and a control vector associated with KD. The decryption process is the inverse of the encryption process shown in FIG. 8.

3. Set KD:=128-bit value produced by the Generate Customer Key (GCK) internal function 113, where the inputs to the GCK function are the 10 decimal digit customer number, the 32-bit counter, and the 128-bit KGK recovered at step 1 above.

4. Set KC':=128-bit value produced by the Generate Variant Customer Key (GVCK) function 116, where the input to the GVCK function is the customer key KC. (The GVCK function is also called function f elsewhere in the description of the subject invention.)

Figure 10:
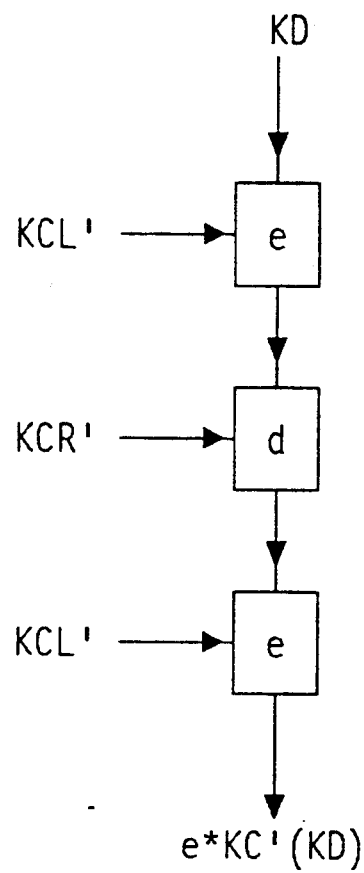
FIG. 10 is a block diagram illustration of the method for encrypting a data key with a variant customer key KC'.

5. Set e*KC'(KD):=value produced by encrypting KD with KC' using the method illustrated in FIG. 10. The method consists of encrypting KD with KCL', the leftmost 64 bits of KC', decrypting the result with KCR', the rightmost 64 bits of KC', and finally encrypting that result with KCL'.

6. Return e*KC'(KD) as the output encrypted data key.

The Generate Variant Customer Key (GVCK) function 116 generates a 128-bit variant customer key KC' from a 128-bit customer key KC. The GVCK function is also referred to as function f elsewhere in the subject invention. Function f can, in the simplest case, be an identity function that merely sets KC':=KC, if there is some perceived advantage in doing so. In fact, function f can be any function that is desired, including a 1-way function or a 2-way function where an inverse function f-inv exists such that KC:=f-inv(KC'). In the preferred embodiment of the invention, function f is a one-way function (not an encryption function) so that for practical purposes calculating KC from KC' is considered computationally difficult or hard. In effect, this eliminates a potential problem in obtaining a U.S. Government export license for products containing function f. In any case, the objectives of function f can be achieved with a 1-way or 2-way function. The objectives of function f are these:

1. To provide a means whereby encrypted multimedia files cannot be decrypted except at a user processor with a capability for multimedia file recovery, as specified by the invention. That is, an encrypted file and the keys needed for decrypting the file are not, by themselves, enough to decrypt the file.

2. To provide a multimedia file recovery procedure that uses a copyright-protected function (f) which is new and unique to the file recovery procedure (one cannot refer to the function elsewhere in the open literature), which is complex (one cannot easily describe it), and which is of modest size (it is not easily hidden if copied and stored within a computing system).

It should be pointed out that the left half of the customer key KC can become the left half of the variant customer key KC' directly, while the right half of the customer key KC is used to produce the right half of the variant customer key KC'. The left half of the customer key is termed KCL and the right half of the customer key is termed KCR. The left half of the variant customer key is termed KCL' and the right half of the variant customer key is termed KCR'.

It should also be pointed out that all of the following examples use a large file (say 8,000 bytes) that contains copyright information, for example, "COPYRIGHT 1992 BY IBM" and other data. One of the goals in the construction of this file is that it is difficult to compress it and store it in a much shortened form. One way to achieve this is to have much of the data in the file be random or appear to be random. The data that appears to be random could be produced by the encryption of a highly structured clear file that is itself copyright protected. The encryption key in this case is a secret known only to the creator of the file. The goal is to require the adversary trying to simulate the process of deriving the variant customer key to use the large file or a derivative file to do the simulated calculation thus aiding in showing the violation of copyright. This large file is termed the copyright file.

A first example of function f is to use DEA ECB encryption on the copyright file. The right half of the customer key KC is the encryption key. The ciphertext is then reduced via a one-way process to the needed size to produce the right half of the variant customer key. This may be done, for example, via an exclusive-OR operation or an addition modulo $2^{}64$ operation where  indicates exponentiation. As a final step, the value may be adjusted to have odd byte parity. Other combining functions are possible. In this case, the left half of the variant customer key is set equal to the left half of the customer key.

A second example of function f is to use DEA CBC encryption of the copyright file. The right half of the customer key KC is used as the encryption key to encrypt the copyright file. The last 64-bit block of ciphertext is used as the right half of the customer key variant, after adjusting for odd byte parity. In this case, the left half of the variant customer key is set equal to the left half of the customer key.

A third example of function f is to prefix the copyright file with the value of the customer key KC and to execute MDC-2 or MDC-4 on the result to produce the output 128-bit MDC which is the value of the customer key variant, after adjusting for key parity. For a description of the MDC-2 or MDC-4 process, see U.S. Pat. No. 4,908,861 (found in the list of prior art).

As a fourth example, the copyright file is used as the key for a mixing process, as follows:

1. Set the accumulator register to the value of the customer key KC.

2. Set the copyright file bit pointer to the first bit in the file.

a. Read the value of the bit in the copyright file corresponding to the bit pointer.

b. If the bit has a value of 0, execute substitution function 1 on the contents of the accumulator register.

c. Else, execute substitution function 2 on the contents of the accumulator register.

d. Execute permutation function 1 on the contents of the accumulator register.

e. If bit pointer is at end of copyright file, exit. The contents of the accumulator register at this time is the value of the variant customer key variant, after adjusting it for odd byte parity.

f. Else increment the value of the bit pointer and go to the top of the loop to read the value of the next bit in the copyright file.

Substitution function 1 and substitution function 2 are different functions that examines each byte in the accumulator register and replaces it with another value.

For example, substitution function 1 could be defined as follows, all values are in decimal:

| S1 input | S1 output | | | | | | | | | | | | | | | |
|---|---|---|---|---|---|---|---|---|---|---|---|---|---|---|---|---|
| 0...15 | 204 | 63 | 211 | 90 | 168 | 161 | 231 | 225 | 103 | 118 | 154 | 206 | 120 | 201 | 235 | 71 |
| 16...31 | 88 | 219 | 200 | 128 | 102 | 224 | 125 | 241 | 177 | 160 | 45 | 21 | 78 | 23 | 19 | 183 |
| 32...47 | 194 | 113 | 232 | 1 | 130 | 159 | 133 | 234 | 202 | 170 | 137 | 127 | 39 | 22 | 35 | 131 |
| 48...63 | 101 | 51 | 176 | 10 | 227 | 3 | 73 | 157 | 209 | 83 | 20 | 179 | 172 | 218 | 248 | 222 |
| 64...79 | 62 | 56 | 165 | 163 | 190 | 5 | 32 | 217 | 230 | 104 | 150 | 64 | 42 | 184 | 249 | 171 |
| 80...95 | 85 | 121 | 180 | 117 | 220 | 189 | 245 | 75 | 8 | 98 | 188 | 77 | 87 | 17 | 53 | 6 |
| 96...111 | 129 | 210 | 247 | 213 | 72 | 187 | 114 | 115 | 55 | 111 | 93 | 156 | 105 | 126 | 44 | 41 |
| 112...127 | 34 | 254 | 186 | 253 | 228 | 110 | 97 | 91 | 82 | 255 | 119 | 238 | 152 | 173 | 136 | 11 |
| 128...143 | 174 | 58 | 7 | 240 | 46 | 199 | 76 | 30 | 233 | 169 | 29 | 26 | 16 | 162 | 149 | 237 |
| 144...159 | 196 | 239 | 178 | 138 | 108 | 74 | 242 | 36 | 182 | 37 | 89 | 221 | 164 | 205 | 94 | 68 |
| 160...175 | 175 | 96 | 250 | 50 | 99 | 140 | 243 | 70 | 100 | 122 | 12 | 66 | 146 | 43 | 109 | 216 |
| 176...191 | 81 | 132 | 236 | 135 | 139 | 79 | 95 | 84 | 166 | 151 | 142 | 148 | 67 | 18 | 65 | 192 |
| 192...207 | 144 | 123 | 92 | 38 | 31 | 158 | 185 | 214 | 27 | 28 | 208 | 59 | 191 | 49 | 244 | 252 |
| 208...223 | 198 | 223 | 141 | 107 | 1 | 95 | 124 | 153 | 229 | 197 | 5 | 86 | 207 | 147 | 226 | 145 |
| 224...239 | 60 | 54 | 61 | 212 | 25 | 134 | 24 | 193 | 52 | 0 | 40 | 33 | 167 | 15 | 13 | 2 |
| 240...255 | 14 | 4 | 80 | 143 | 155 | 47 | 251 | 215 | 106 | 112 | 69 | 2469 | 48 | 116 | 203 | 181 |

For example, the substitutes for 0, 1, and 2 are 14, 204 and 63, respectively.

Substitution function 2 could be defined as follows, all values are in hexadecimal:

| S2 input | S2 output | | | | | | | | | | | | | | | |
|---|---|---|---|---|---|---|---|---|---|---|---|---|---|---|---|---|
| 0...15 | 214 | 158 | 73 | 249 | 112 | 104 | 179 | 91 | 229 | 87 | 143 | 207 | 243 | 204 | 34 | 133 |
| 16...31 | 56 | 219 | 109 | 157 | 114 | 79 | 139 | 11 | 28 | 82 | 184 | 245 | 240 | 163 | 6 | 254 |
| 32...47 | 218 | 135 | 174 | 200 | 30 | 66 | 52 | 59 | 255 | 132 | 75 | 37 | 76 | 41 | 70 | 176 |
| 48...63 | 164 | 149 | 5 | 216 | 153 | 23 | 122 | 250 | 113 | 165 | 166 | 42 | 31 | 198 | 247 | 145 |
| 64...79 | 120 | 144 | 160 | 173 | 80 | 208 | 63 | 203 | 185 | 236 | 202 | 209 | 210 | 48 | 55 | 152 |
| 80...95 | 15 | 12 | 77 | 215 | 239 | 62 | 47 | 58 | 156 | 123 | 39 | 21 | 140 | 134 | 213 | 115 |
| 96...111 | 205 | 168 | 253 | 36 | 242 | 0 | 251 | 169 | 226 | 17 | 171 | 196 | 83 | 124 | 106 | 182 |
| 112...127 | 129 | 211 | 96 | 177 | 241 | 2 | 65 | 90 | 189 | 89 | 71 | 192 | 32 | 146 | 45 | 116 |
| 128...143 | 93 | 121 | 170 | 40 | 100 | 35 | 94 | 131 | 137 | 74 | 60 | 43 | 167 | 161 | 223 | 148 |
| 144...159 | 92 | 51 | 69 | 155 | 225 | 111 | 72 | 78 | 88 | 103 | 248 | 191 | 235 | 27 | 107 | 119 |
| 160...175 | 227 | 188 | 238 | 127 | 154 | 197 | 190 | 232 | 237 | 180 | 147 | 101 | 187 | 150 | 19 | 16 |
| 176...191 | 81 | 8 | 130 | 125 | 25 | 194 | 105 | 7 | 38 | 9 | 24 | 95 | 199 | 252 | 228 | 138 |
| 192...207 | 49 | 1 | 141 | 151 | 186 | 221 | 117 | 234 | 33 | 206 | 50 | 224 | 178 | 222 | 233 | 22 |
| 208...223 | 10 | 172 | 175 | 230 | 13 | 84 | 183 | 231 | 26 | 220 | 118 | 54 | 102 | 18 | 195 | 136 |
| 224...239 | 98 | 3 | 212 | 99 | 246 | 44 | 85 | 14 | 162 | 128 | 201 | 126 | 20 | 86 | 110 | 159 |
| 240...255 | 53 | 142 | 61 | 68 | 97 | 64 | 29 | 244 | 4 | 108 | 46 | 57 | 67 | 193 | 181 | 217 |

It is desirable to make the substitution functions S1 and S2 1-to-1 functions.

The permutation function mixes all the bits in the input to produce the output. For example, the permutation function could be:

| P1 Input | P1 Output | | | | | | | | | | | | | | | |
|---|---|---|---|---|---|---|---|---|---|---|---|---|---|---|---|---|
| 0...15 | 11 | 54 | 27 | 22 | 38 | 32 | 61 | 24 | 56 | 44 | 48 | 58 | 55 | 5 | 21 | 34 |
| 16...31 | 52 | 14 | 20 | 36 | 59 | 63 | 49 | 4 | 6 | 18 | 39 | 35 | 43 | 19 | 50 | 2 |
| 32...47 | 42 | 53 | 23 | 40 | 9 | 1 | 17 | 33 | 60 | 30 | 3 | 51 | 26 | 12 | 45 | 62 |
| 48...63 | 29 | 10 | 25 | 41 | 13 | 0 | 31 | 16 | 7 | 46 | 28 | 47 | 8 | 57 | 15 | 37 |

In the above example, the value of bit offset 0 in the input is the value of the bit offset 11 in the output.

By this process of substitution and permutation a thorough mixing of the input bits is achieved yet the copyright file cannot be eliminated or substantially reduced as it is needed to determine the calculation.

In an alternate embodiment, the substitution functions could process a subset of the bytes in the accumulator register. For example, the substitution functions could be performed on the first byte only, the first and second bytes only, or any other desired subset of the sixteen bytes. This might be done to improve performance.

In yet another embodiment, only the rightmost 8 bytes of the customer key are loaded in the accumulator register and the substitution functions are performed on a subset of the eight bytes. In this case, the final result is defined as the rightmost eight bytes of the variant customer key and the leftmost eight bytes of the variant customer key are set equal to the leftmost eight bytes of the customer key.

When clear customer keys and encrypted data keys are generated for users, i.e., key distribution is done via the protocol shown in FIG. 1, the 32-bit counter CTR provided as input to the Clear Customer Key Generate service 124 and the Data Key Export service 125 is set to zero (CTR=0). When clear customer keys and encrypted data keys are generated for third party merchants, via the protocol shown in FIG. 2, the 32-bit counter CTR is used as an incrementing counter (CTR=1, CTR=2, etc.).

Figure 11:
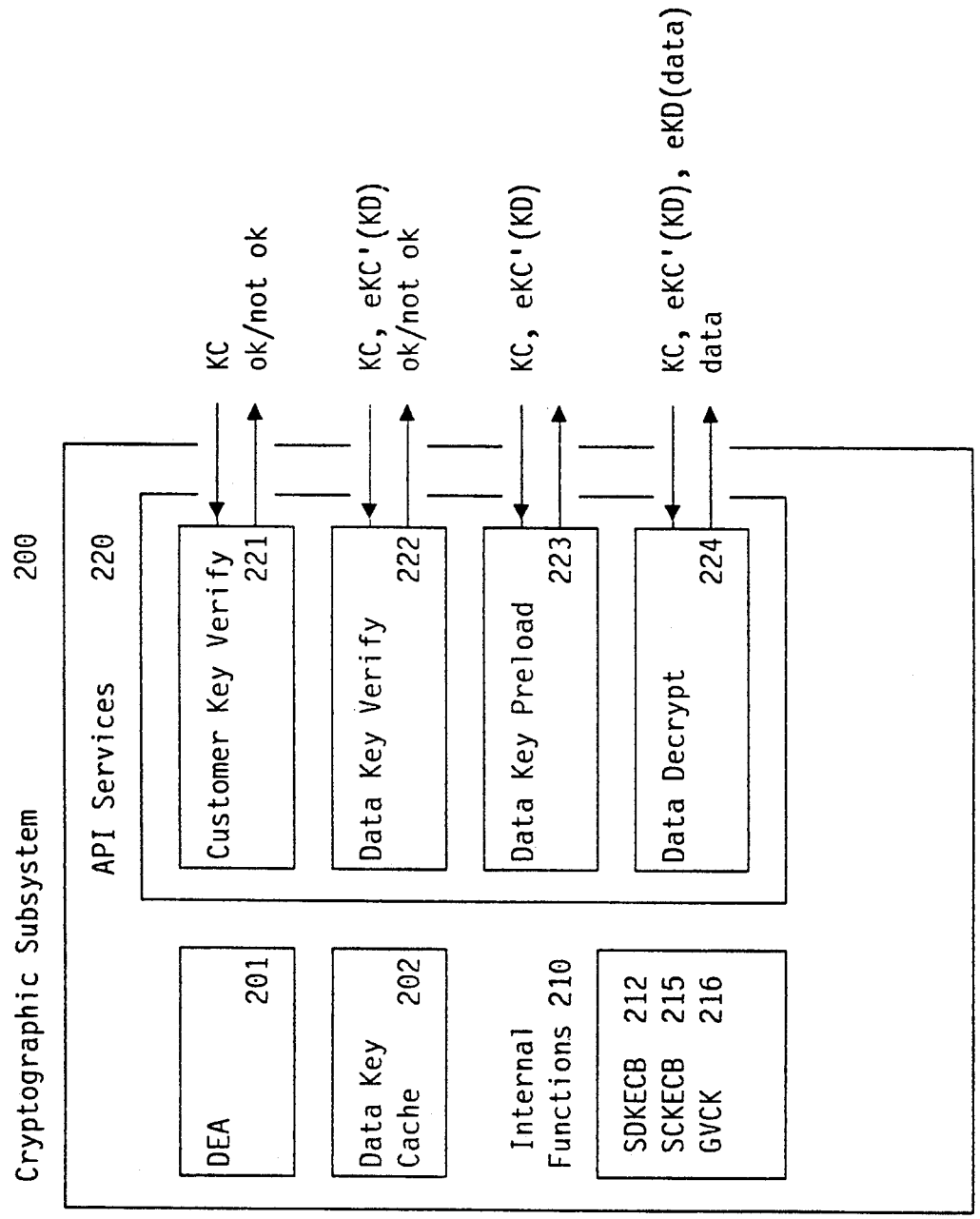
FIG. 11 is a block diagram illustration of cryptographic subsystem 200 at user processor 20.

FIG. 11 is a block diagram illustration of cryptographic subsystem 200. Cryptographic subsystem 200 contains a Data Encryption Algorithm (DEA) 201 capable of performing elementary operations of encryption and decryption, a data key cache 202 for storing decrypted data keys, a set of API-callable services 220 for performing data decryption and key management functions required by the user processor 20, and a set of internal functions 210 which are called by the API services and which eliminate processing redundancies within or maintain consistency across the set of API-callable services. The API-callable services 220 include Customer Key Verify 221, Data Key Verify 222, Data Key Preload 223, and Data Decrypt 224. Those skill in the art will recognize that cryptographic subsystem 200 can contain other API services such as a high-integrity Verification Data Decrypt (VDD) service for validating a data key before it is used for decrypting data. For example, the VDD service could decrypt an encrypted value and check the value for equality with a value-of-reference stored in cryptographic subsystem 200. While such a service enhances the utility of the cryptographic subsystem, it is not a crucial part of the subject invention. The Internal Functions 210 include Set Data Key Error Checking Bits (SDKECB) 212, Set Customer Key Error Checking Bits (SCKECB) 215, and Generate Variant Customer Key (GVCK) 216.

Referring again to FIG. 11, the Customer Key Verify (CKV) function 221 authenticates the error checking bits in an input customer key KC and returns a value indicating that the authentication succeeded (e.g., return code=0) or failed (e.g., return code=8). The process of authenticating the error checking bits in KC consists of the following method steps:

1. Set X:=KC (i.e., make a second copy of KC)
2. Set Y:=128-bit value produced by the SCKECB function 215, using X as the 128-bit input to the function. The SCKECB function 215 in cryptographic subsystem 200 in user processor 20 is the same as the SCKECB function 115 in cryptographic subsystem 100 in software distribution processor 10. See the description of SCKECB function 115.
3. If Y=KC, then set return code:=0 (success) else set return code:=8 (failure).
4. Return the value of return code as a function output.

The Data Key Verify (DKV) function 222 decrypts an encrypted data key of the form e*KC'(KD) using a variant customer key KC' derived from an input customer key KC, authenticates the error checking bits in KD, and returns a value indicating that the authentication succeeded (e.g., return code=0) or failed (e.g., return code=8). The DKV function 222 consists of the following steps:

1. Set KC':=128-bit variant customer key produced by Generate Variant Customer Key (GVCK) function 216, using KC as an input to the function. The GVCK function 216 in cryptographic subsystem 200 in user processor 20 is the same as the GVCK function 116 in cryptographic subsystem 100 in software distribution processor 10. See the description of GVCK function 116.
2. Decrypt e*KC'(KD) with the variant customer key KC' produced in step 1 above. The method of decryption is just the inverse of the method of encryption shown in FIG. 10. That is e*KC'(KD) is decrypted with KCL', the leftmost 64 bits of KC', the result is encrypted with KCR', the rightmost 64 bits of KC', and that result is decrypted with KCL'.
3. Set X:=KD (i.e., make a second copy of KD)
4. Set Y:=64-bit value produced by the SDKECB function 212, using X as the 64-bit input to the function. SDKECB function 212 in cryptographic subsystem 200 is just the same function as SDKECB function 112 in cryptographic subsystem 100. See the description of SDKECB function 112.
5. If Y=KD, then set return code:=0 (success) else set return code:=8 (failure).
6. Return the value of return code as a function output.

The Data Key Preload (DKP) function 223 decrypts an encrypted data key of the form e*KC'(KD) using a variant customer key KC' derived from an input customer key KC, creates a cache record consisting KC, e*KC'(KD), and KD, and stores the cache record in data key cache 202. The DKP function 223 consists of the following steps:

1. Set KC':=128-bit variant customer key produced by Generate Variant Customer Key (GVCK) function 216, using KC as an input to the function. The GVCK function 216 in cryptographic subsystem 200 in user processor 20 is the same as the GVCK function 116 in cryptographic subsystem 100 in software distribution processor 10. See the description of GVCK function 116.
2. Decrypt e*KC'(KD) with the variant customer key KC' produced in step 1 above. The method of decryption is just the inverse of the method of encryption shown in FIG. 10. That is e*KC'(KD) is decrypted with KCL', the leftmost 64 bits of KC', the result is encrypted with KCR', the rightmost 64 bits of KC', and that result is decrypted with KCL'.
3. Set cache record:=concatenation of KC, e*KC'(KD), and KD.
4. Store the so-produced cache record in Data Key Cache 202. The customer key and encrypted data key are used as identifiers to determine whether the corresponding data key KD is stored in Data Key Cache 202. The Data Key Cache 202 is used by the Data Decrypt function 224.

The Data Decrypt (DD) function 224 decrypts encrypted data of the form eKD(0,data), where 0 represents an initial chaining value of 0 (i.e. ICV=X'0000000000000000') and data represents n 64-bit blocks of data, using the Cipher Block Chaining (CBC) mode of DEA decryption. In an actual implementation, a maximum value for n can be established, e.g., the maximum value of n may be 2**32. For example, an upper bound on n may need to be established due to some physical limitation in the implemented cryptographic subsystem. The inputs to DD function 224 are a customer key KC, and encrypted customer key eKC'(KD), and encrypted data eKD(0,data). The output of DD function 224 is the decrypted data. The DD function 224 consists of the following steps:

1. Using KC and eKC'(KD) as identifiers, search the Data Key Cache 202 for a cache record containing KC, eKC'(KD), and KD. If a cache record is found, extract KD from the recovered cache record and jump to step 4, else continue (i.e., decrypt the encrypted KD)
2. Set KC':=128-bit variant customer key produced by Generate Variant Customer Key (GVCK) function 216, using KC as an input to the function. The GVCK function 216 in cryptographic subsystem 200 in user processor 20 is the same as the GVCK function 116 in cryptographic subsystem 100 in software distribution processor 10. See the description of GVCK function 116.
3. Decrypt e*KC'(KD) with the variant customer key KC' produced in step 2 above. The method of decryption is just the inverse of the method of encryption shown in FIG. 10. That is e*KC'(KD) is decrypted with KCL', the leftmost 64 bits of KC', the result is encrypted with KCR', the rightmost 64 bits of KC', and that result is decrypted with KCL'.
4. Set data:=plaintext recovered when eKD(0,data) is decrypted with KD (obtained at step 1 or step 3) and initial chaining value=0 using the CBC mode of DEA decryption.
5. Return data as a function output.

Figure 12:
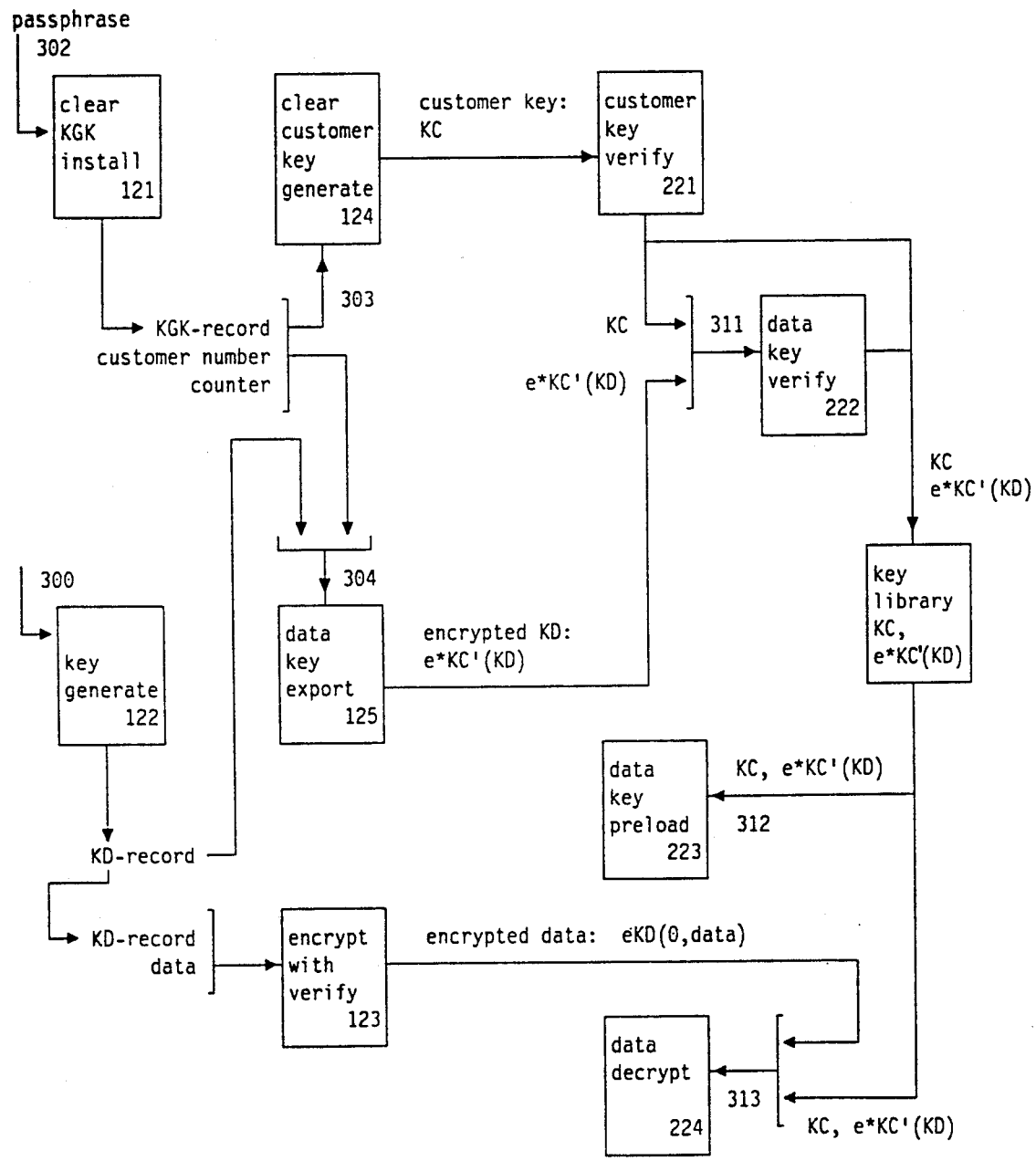
FIG. 12 is a block diagram illustration of the sequence of API-callable services that must be performed to accomplish software distribution from software distribution center 10 to user processor 20.

FIG. 12 is a block diagram illustration of the sequence of API-callable services that must be performed to accomplish software distribution from software distribution center 10 to user processor 20. Referring to FIG. 12, at software distribution processor 10, a Data Key Generate service 122 is invoked at step 300 to generate a 64-byte data key record (KD-record) containing an encrypted data key. Step 300 can be repeated as many times as necessary to produce unique KD-records for each multimedia file or group of files to be sold and licensed as a unit. At step 301, the n 64-bit blocks of data and the so-produced 64-byte KD-record are provided as inputs to an Encrypt With Verify service 123, which produces n 64-bit blocks of encrypted data, eKD(0,data). The expression eKD(0,data) indicates that the input data, designated here as "data", is encrypted with key KD and an initial chaining value of zero using CBC mode of DEA encryption. At step 302, a 1 to 80 character passphrase is input to a Clear Key-Generating Key Install service 121, which produces a 64-byte key-generating key record (KGK-record) containing a 128-bit encrypted key-generating key. Step 302 can be repeated as many times as necessary to produce unique KGK-records needed by the key management system for providing cryptographic separation among the generated customer keys. At step 303, the so-produced KGK-record, a 10 decimal digit customer number, and a 32-bit counter are input to a Clear Customer Key Generate service 124, which produces a 128-bit customer key KC. At step 304, one of the plurality of KGK-records produced at step 302, a 10 decimal digit customer number, a 32-bit counter, and one of plurality of KD-records produced at step 300 are input to a Data Key Export service 125, which produces an encrypted data key of the form e*KC'(KD). The expression e*KC'(KD) indicates that 64-bit data key KD is encrypted with 128-bit variant customer key KC'. The customer key KC, the encrypted data key e*KC'(KD), and the encrypted data eKD(0,data) are transmitted from the software distribution processor 10 to the user processor 20. The customer key and encrypted data key are transmitted via key distribution medium 31 and the encrypted data is transmitted via encrypted file distribution medium 30, as illustrated in FIG. 3. At user processor 20, the received customer key KC is input at step 310 to a Customer Key Verify service 221, which causes the error checking bits in the customer key to be authenticated. If the error checking bits are correct, the Customer Key Verify service 221 returns a success (return code=0) in which case the customer key KC is stored in a key library for subsequent use. If the error checking bits are incorrect, the Customer Key Verify service 221 returns a failure (return code=8) in which case the customer key is rejected. If the customer key fails to authenticate properly, an error recovery procedure (not shown in FIG. 12) is executed. Those skilled in the art will recognize that there are many possible methods and protocols for error recovery including sending a message to the software distribution process 10 and requesting that the customer key be re-transmitted. The error recovery step is not essential to the working of the subject invention, but would be a necessary part of an actual implementation of the subject invention. It shall be assumed here that the error checking bits in the customer key KC authenticate properly. At step 311, the authenticated KC and the received, associated encrypted data key, e*KC'(KD), are input to a Data Key Verify service 222, which causes the error checking bits in the data key KD to be authenticated. Of course, this requires that the encrypted data key first be decrypted under the variant customer key KC', which is produced from the received so-authenticated input customer key KC. If the error checking bits are correct, the Data Key Verify service 222 returns a success (return code=0) in which case the encrypted data key, e*KC'(KD), is stored in a key library for subsequent use. If the error checking bits are incorrect, the Data Key Verify service 222 returns a failure (return code=8) in which case the encrypted data key, e*KC'(KD), is rejected and not stored in the key library. If the encrypted data key fails to authenticate properly, an error recovery procedure (not shown in FIG. 12) is executed. Those skilled in the art will recognize that there are many possible methods and protocols for error recovery including sending a message to the software distribution process 10 and requesting that the encrypted data key be re-transmitted. The error recovery step is not essential to the working of the subject invention, but would be a necessary part of an actual implementation of the subject invention. It shall be assumed here that the error checking bits in the data key KD authenticate properly. Those skilled in the art will also recognize that there are many ways in which a key library can be implemented, and that this aspect of the key management does not affect the working of the subject invention. However, when a customer key KC and an associated encrypted data key e*KC'(KD) are stored in the key library, a link must be provided from the encrypted data key to the corresponding customer key to be used in decrypting the encrypted data key. This can be accomplished in many different ways including the simple approach of storing KC and e*KC'(KD) as a key pair in a single record. However, this has the disadvantage that the same KC is stored many times in the key library. Storing customer keys a separate sub-library and providing a link or pointer from the encrypted data key to its associated customer key is more economical in terms of required storage space, especially if many keys are stored in the key library. At step 312, the so-authenticated encrypted data key e*KC'(KD) and its so-associated, so-authenticated customer key KC are input to a Data Key Preload service 213, which (1) decrypts e*KC'(KD) with a variant customer key KC' produced from the input KC, (2) produces a cache record consisting of the concatenation of KC, e*KC'(KD), and KD, and (3) stores the cache record in Data Key Cache 214 shown in FIG. 11. At step 313, the so-authenticated e*KC'(KD), the so-associated and so-authenticated KC, and the so-associated, so-received n 64-bit blocks of encrypted data, designated eKD(0,data), are input to a Data Decrypt service 224, which produces n 64-bit blocks of decrypted data. The data key KD used for decrypting eKD(0,data) is recovered either from Data Key Cache 214 or by decrypting e*KC'(KD) with a KC' produced from the input KC.

Figure 13:
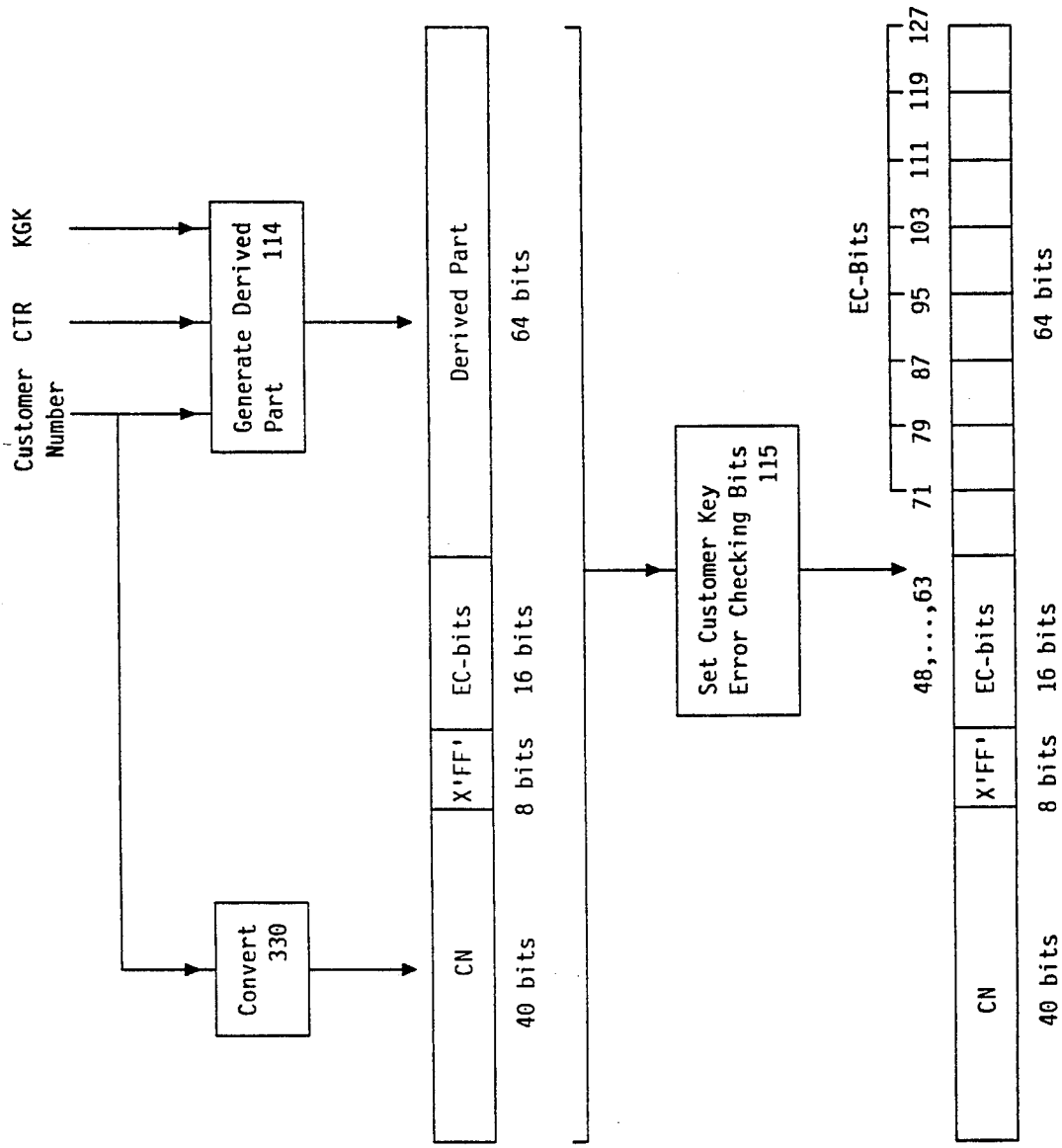
FIG. 13 is a block diagram illustration of the process for producing a customer key with the Generate Customer Key (GCK) internal function 113 available in cryptographic subsystem 100 of software distribution processor 10, as shown in FIG. 4.

FIG. 13 is a block diagram illustration of the process for producing a customer key with the Generate Customer Key (GCK) internal function 113 available in cryptographic subsystem 100 of software distribution processor 10, as shown in FIG. 4. At step 320, a 10 decimal digit customer number, a 32-bit counter CTR, and a 128-bit key-generating key KGK are input to a Generate Derived Part internal function 114, which produces a 64-bit Derived Part. The so-produced Derived Part is stored as the rightmost 64 bits of intermediate key 340. The 10 decimal digit customer number is also input to Convert function 330 which converts each decimal digit to a 4-bit "nibble" (i.e., 0=B'0000', 1=B'0001', 2=B'0010', etc.), concatenates the 10 "nibbles" to form a 40-bit value CN, and stores the 40-bit CN as the leftmost 40 bits of intermediate key 340. Bits 40 thru 47 of intermediate key 340 are set to a constant X'FF'; bits 48 thru 63 of intermediate key 340 are not initialized, since they are later initialized by a Set Customer Key Error Checking Bits internal function 115. (The bits of the intermediate key 340 are numbered 0, 1, ..., 127, from most significant to least significant.) The so-produced intermediate key 340 is input to a Set Customer Key Error Checking Bits (SCKECB) internal function 115, which produces customer key 350. The distinction between intermediate key 340 and customer key 350 is that in intermediate key 340 the 24 error checking bits are not initialized and in customer key 350 they are initialized. The error checking bits are located in bit positions 48 thru 63, inclusive, 71, 79, 87, 95, 103, 119 and 127 of customer key 350. The reader will also see from FIG. 13 that customer key 350 contains a clear customer number. Thus, when a customer key is transmitted via key distribution medium 31 or when a customer key is stored in a key library at user processor 20, the customer number — which is a sub-field of the customer key — appears in clear form so that it may be audited and used as a means to trace the key back to the original user to which the key was issued. Moreover, when the customer key is transmitted via key distribution medium 31, it is first translated from 16 characters (i.e., a 128-bit value) to 32 hexadecimal-coded native characters (e.g., ASCII characters) so that each decimal digit in the customer key will be represented as a single character. Thus, if the customer key is printed on a piece of paper, the customer number is plainly visible within the customer key. This especially true since the customer number is positioned as the first field in the customer key and is immediately followed by the constant "FF". For example, a customer key might appear in printed form as 0009735124FF3A02D52AB99128C8F634 so that the customer number is 0009735124.

Figure 14:
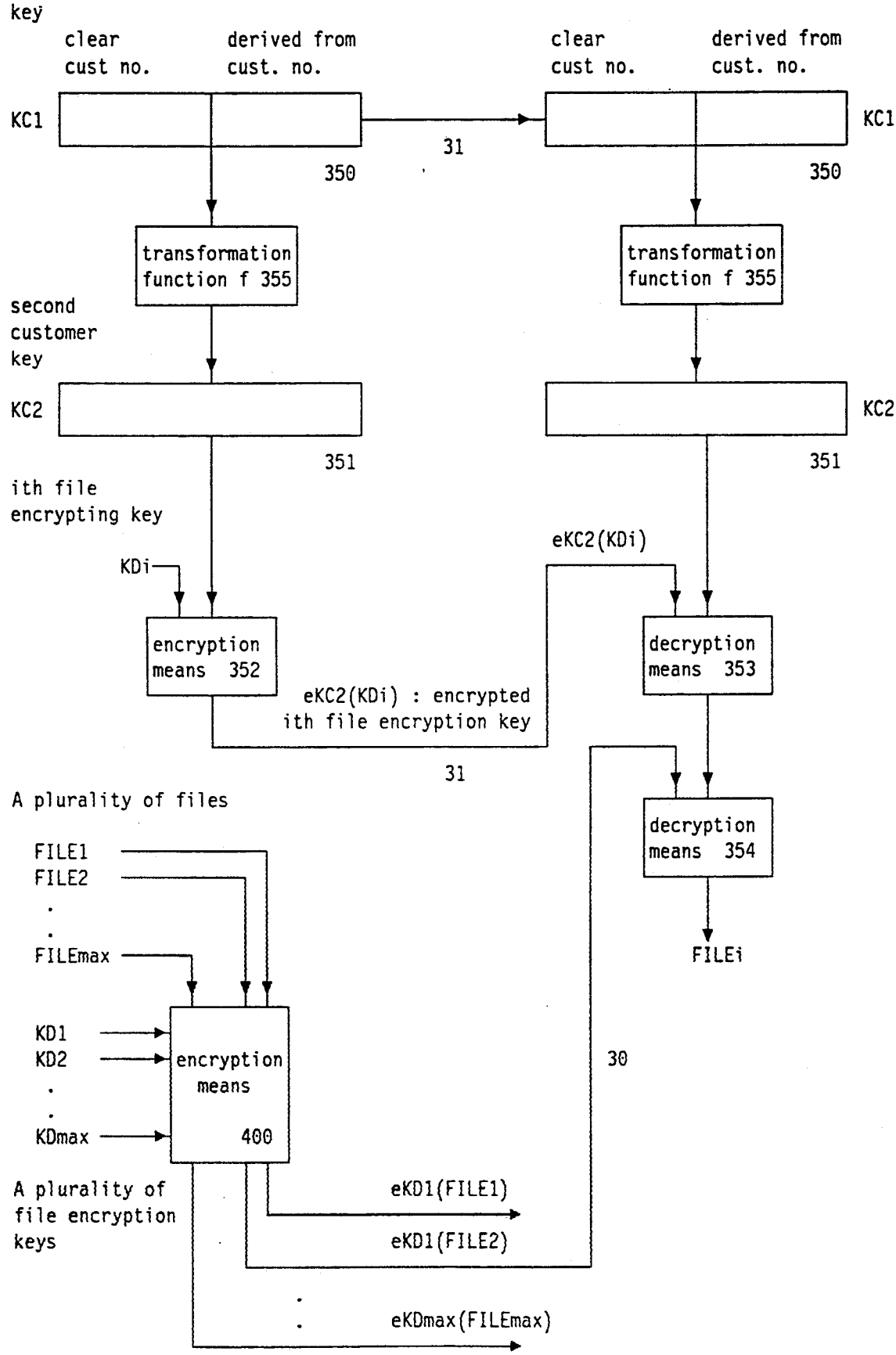
FIG. 14 is a block diagram illustration of software distribution from a software distribution processor 10 to a user processor 20.

FIG. 14 is a block diagram illustration of software distribution from a software distribution processor 10 to a user processor 20. At software distribution processor 10, a plurality of files (FILE1, FILE2, FILEmax) including an ith file, FILEi, are encrypted via encryption means 400 with a corresponding plurality of file encryption keys (KD1, KD2, ..., KDmax) including an ith file encryption key, KDi, to produce a plurality of encrypted files (eKD1(FILE1), eKD2(FILE2), ..., eKDmax(FILEmax)) including an ith encrypted file eKDi(FILEi). A subset of the plurality of so-produced encrypted files is transmitted via encrypted file distribution medium 30 from software distribution processor 10 to user processor 20. In response to a customer order for software, say for FILEi, a first customer key KC1 350 is produced. Next, the so-produced customer key is input to transformation function f 355 to produce a second customer key KC2 351. Transformation function f 355 is just the Generate Variant Customer Key (GVCK) internal function 116 of FIG. 4. First customer key KC1 350 is just the same customer key 350 of FIG. 13. Second customer key KC2 351 is just the variant customer key which is produced from a customer key using the GVCK internal function 116. The so-produced second customer key KC2 351 and the ith data key KDi are input to an encryption means 352 to produce an encrypted data key e*KC2(KDi). The process of producing second customer key KC2 351 with transformation function f 355, and of encrypting KDi with KC2 via encryption means 352, is primarily the function performed by the Data Key Export service 125 of FIG. 4. The so-produced first customer key KC1 and the so-produced encrypted ith file encryption key eKC2(DKi) are transmitted via key distribution medium 31 from software distribution processor 10 to user processor 20. At user processor 20, received first customer key KC1 350 is input to a like transformation function f 355 which produces second customer key KC2 351. The so-produced second customer key KC2 351 and the received ith encrypted file key eKC2(KDi) are input to a decryption means 353, which decrypts eKC2(KDi) with KC2 to produce a clear value of KDi. The so-produced ith file key KDi and the received ith encrypted file eKDi(FILEi) are input to a decryption means 354, which decrypts FILEi. FILEi is returned as an output to user processor 20. The process of producing KC2 from KC1 with transformation function f 355 and the process of decrypting eKC2(KDi) with KC2 are just the operations performed by Data Key Preload service 223 of FIG. 11.

Third Party Merchant: The method of software distribution from a software vendor to a user can is easily adapted to the situation where software is distributed from a software vendor to a third party merchant and thence from the third party merchant to a user. The concept of such a method of software distribution is illustrated in FIG. 2.

When a third party merchant contacts the software vendor (say IBM) and requests to buy software on CD-ROMs, the software vendor supplies the third party merchant packages with a CD-ROM and pregenerated keys. Suppose that the merchant want to place an order for quantities of software as shown in FIG. 15, i.e., 200 OS/2 2.0, 100 OS/2 2.0 Extended Services, 500 WordPerfect for OS/2, 50 Program A, 100 Program B. Assume that all of the software programs are packaged on one CD-ROM and all are protected using the method of encryption described by the subject invention. In this case, the software distribution processor 10 would generate 200 keys for OS/2, printing them on a pre-numbered sheet of paper or special form with the following characteristics. Each sheet of paper would be of the type that has a window with an address of the dealer that can be read from the outside but the key is readable only after you "open" the form. The software vendor would seal a CD-ROM and a key sheet, along with the license information and other papers in a shrink wrapped package.

The production of a customer key is different depending on whether the key is distributed directly to a user or whether it is distributed first to a merchant and then to a user. In situations where customer keys are generated for users, the 32-bit counter CTR provided as an input to the Clear Customer Key Generate service 124 and to the Data Key Export service 125 is set to zero. However, where customer keys are generated for merchants, the 32-counter CTR provided as an input to the Clear Customer Key Generate service 124 and to the Data Key Export service 125 starts with value 1 and is incremented by one for each key. This permits many different customer keys to be generated and distributed to the same merchant who has a single customer number. The counter would be incremented one for each key so each customer key would be different, and thus the encrypted data key e*KC'(KD) would be different for each software program in each shrink wrapped package. The software program that the keys unlock would be clearly identified on the outside wrapping of the package.

The same procedure would be used to produce the keys for each different software program, or product, such as OS/2 ES. The software distribution processor would generate 100 sets of keys (customer key and encrypted data key), using the counter set at the last value, in this case 200). These keys would be packaged with a CD-ROM and clearly marked with the ES product indentification. The remaining products would be packaged in the same way. The dealer would receive 950 CD-ROMs with 950 sets of keys. All packages would be 8½ by 11 inches, shrink wrapped. Each package would have a pre-printed number on it, like the red numbers printed on the edge of computer forms.

When a customer comes into the merchant's store and asks to purchase OS/2, the dealer sell him one of the OS/2 packages. The dealer may or may not elect to record the pre-printed number as being sold to that customer. If the customer gets back to his business and finds out that he needs the ES features, there are several options for getting this extra needed software. The customer could call the merchant, who in turn could open another shrink wrapped package and give the customer the key set for ES over the phone. Alternatively, the customer could come into the store and pick up the key set. The customer could go to another dealer and purchase ES. The entire transaction, at that point, is between the dealer and the customer. It is not necessary that software vendor be involved other than perhaps providing a way to verify and replace "lost" keys. However, there is nothing to prevent a customer from calling the software vendor directly and getting a key set issued over the telephone.

The key management approach eliminates the need for a dealer to have key generation equipment. This also simplifies the accounts payable interaction between the software vendor and merchants (dealers) The merchant buys the inventory they want and pays for that inventory. The software vendor could have some provision for returning unopened packages to handle the unsold inventory issue. In this scheme, the software vendor treats the dealer as a customer.

FIG. 16 is an illustration of a shrink wrapped package 500 containing a stamped medium 501 (e.g., a CD-ROM) containing (1) an ith encrypted file eKDi(file i) 503, i.e., file i encrypted with ith file encryption key KDi and (2) a piece of paper 502 on which is printed a clear customer key KC 504 and an encrypted ith file key e*KC'(KDi) 505, where KC' is the variant customer key produced from KC 505. As mentioned, the piece of paper 502 on which the keys are printed is such that the keys cannot be seen except by opening the shrink wrapped package 500 (which in effect means that the package has been purchased). KC 504 is written as 32 hexadecimal-coded characters (e.g., ASCII) and e*KC'(KDi) 505 is written as 16 hexadecimal-coded characters (e.g., ASCII). When a user purchases a shrink wrapped package 500 of software, say OS/2, from the merchant, the keys (customer key 504 and encrypted data key 505) must be entered manually at user processor 20. Once initialized at user processor 20, key processing and file recovery proceeds in the same way as for the case of software distribution from a software vendor to a user. In effect, the only procedural difference is that when a merchant is involved in the key and file distribution process, keys are received by a user over a key distribution medium 31 from a third party merchant 15 rather than from a software distribution processor 10. Likewise, the encrypted file is received over an encrypted file distribution medium 30 from a third party merchant 15 rather than from a software distribution processor 10. The fact that the customer keys provided to a third part merchant are produced with an incrementing counter CTR rather than a counter value of zero (CTR=0) is transparent to the key and file recovery processes carried out at user processor 20.

Although a specific embodiment of the invention has been disclosed, it will be understood by those having skill in the art that changes can be made to that specific embodiment without departing from the spirit and the scope of the invention.

What is claimed is:

1. A method for securely distributing a plurality of software files from a software distribution processor to a user processor, and selectively enabling the user processor to use a subset of a lesser plurality of said plurality of software files, comprising the steps of:

storing in said software distribution processor a plurality of software files including an ith software file;

storing in said software distribution processor a plurality of file encryption keys including an ith file encryption key;

encrypting in said software distribution processor said plurality of said software files, using corresponding ones of said plurality of file encryption keys, including encrypting said ith file using said ith file encryption key, producing a plurality of encrypted files which includes an ith encrypted file which is said ith file encrypted under said ith file encryption key;

transmitting from said software distribution processor to a user processor at least a portion of said plurality of encrypted files;

storing in said software distribution processor, a first customer key which includes a clear customer number and a second portion;

transforming in said software distribution center, said first customer key with a transformation function producing a second customer key;

encrypting said ith file encryption key with said second customer key, producing an encrypted ith file encryption key;

transmitting from said software distribution processor to a user processor, said first customer key;

transmitting from said software distribution processor to said user processor, said encrypted ith file encryption key;

transforming at said user processor said first customer key using said transformed function, producing said second customer key;

decrypting said ith file encryption key received at said user processor using said second customer key, recovering said ith file encryption key;

decrypting said ith encrypted file received at said user processor, using said recovered ith file encryption key, producing said ith software file;

whereby the user processor is enabled to use said ith software file.

2. The method of claim 1 which further comprises said first customer key including a customer number and an authentication code.

3. The method of claim 2 wherein said second portion of said first customer key includes an encrypted expression of said customer number.

4. The method of claim 1 wherein said second portion of said first customer key includes an encrypted expression of said customer number.

5. The method of claim 1 wherein said second portion of said first customer key includes an encrypted expression of said customer number, encrypted under a key encrypting key and a counter value.

6. The method of claim 5 wherein said encrypted expression is a 64-bit DES key, and every eighth parity bit has substituted for it a corresponding authorization bit derived from said customer number.

7. The method of claim 1 wherein said plurality of encrypted files are stored on a CD ROM storage device which is transported from said software distribution processor to said user processor.

8. The method of claim 1 wherein said plurality of encrypted files are stored in a bulk storage at said software distribution processor and are distributed to said user processor over a data communications network.

9. Said method of claim 1 wherein said second portion of said first customer key is an encrypted expression derived from said customer number and a counter value encrypted under a key encrypting key;

said counter value representing a sublicensed customer number.

10. The method of claim 1 wherein a request is transmitted from said user processor to said software distribution processor for said ith file, and in response thereto said ith file encryption key is encrypted and transmitted from said software distribution processor to said user processor.

11. A system for securely distributing a plurality of software files from a software distribution processor to a user processor, and selectively enabling the user processor to use a subset of a lesser plurality of said plurality of software files, comprising:

means for storing in said software distribution processor a plurality of software files including an ith software file;

means for storing in said software distribution processor a plurality of file encryption keys including an ith file encryption key;

means for encrypting in said software distribution processor said plurality of said software files, using corresponding ones of said plurality of file encryption keys, including encrypting said ith file using said ith file encryption key, producing a plurality of encrypted files which includes an ith encrypted file which is said ith file encrypted under said ith file encryption key;

means for transmitting from said software distribution processor to a user processor at least a portion of said plurality of encrypted files;

means for storing in said software distribution processor, a first customer key which includes a clear customer number and a second portion;

means for transforming in said software distribution center, said first customer key with a transformation function producing a second customer key;

means for encrypting said ith file encryption key with said second customer key, producing an encrypted ith file encryption key;

means for transmitting from said software distribution processor to a user processor, said first customer key;

means for transmitting from said software distribution processor to said user processor, said encrypted ith file encryption key;

means for transforming at said user processor said first customer key using said transformed function, producing said second customer key;

means for decrypting said ith file encryption key received at said user processor using said second customer key, recovering said ith file encryption key;

means for decrypting said ith encrypted file received at said user processor, using said recovered ith file encryption key, producing said ith software file;

whereby the user processor is enabled to use said ith software file.

12. The system of claim 11 which further comprises said first customer key including a customer number and an authentication code.

13. The system of claim 12 wherein said second portion of said first customer key includes an encrypted expression of said customer number.

14. The system of claim 11 wherein said second portion of said first customer key includes an encrypted expression of said customer number.

15. The system of claim 11 wherein said second portion of said first customer key includes an encrypted expression of said customer number, encrypted under a key encrypting key and a counter value.

16. The system of claim 15 wherein said encrypted expression is a 64-bit DES key, and every eighth parity bit has substituted for it a corresponding authorization bit derived from said customer number.

17. The system of claim 11 wherein said plurality of encrypted files are stored on a CD ROM storage device which is transported from said software distribution processor to said user processor.

18. The system of claim 11 wherein said plurality of encrypted files are stored in a bulk storage at said software distribution processor and are distributed to said user processor over a data communications network.

19. Said system of claim 11 wherein said second portion of said first customer key is an encrypted expression derived from said customer number and a counter value encrypted under a key encrypting key;

said counter value representing a sublicensed customer number.

20. The system of claim 11 wherein a request is transmitted from said user processor to said software distribution processor for said ith file, and in response thereto said ith file encryption key is encrypted and transmitted from said software distribution processor to said user processor.

21. A method for securely distributing a plurality of multimedia files from a multimedia distribution processor to a user processor, and selectively enabling the user processor to use a subset of a lesser plurality of said plurality of multimedia files, comprising the steps of:

storing in said multimedia distribution processor a plurality of multimedia files including an ith multimedia file;

storing in said multimedia distribution processor a plurality of file encryption keys including an ith file encryption key;

encrypting in said multimedia distribution processor said plurality of said multimedia files, using corresponding ones of said plurality of file encryption keys, including encrypting said ith file using said ith file encryption key, producing a plurality of encrypted files which includes an ith encrypted file which is said ith file encrypted under said ith file encryption key;

transmitting from said multimedia distribution processor to a user processor at least a portion of said plurality of encrypted files;

storing in said multimedia distribution processor, a first customer key which includes a clear customer number and a second portion;

transforming in said multimedia distribution center, said first customer key with a transformation function producing a second customer key;

encrypting said ith file encryption key with said second customer key, producing an encrypted ith file encryption key;

transmitting from said multimedia distribution processor to a user processor, said first customer key;

transmitting from said multimedia distribution processor to said user processor, said encrypted ith file encryption key;

transforming at said user processor said first customer key using said transformed function, producing said second customer key;

decrypting said ith file encryption key received at said user processor using said second customer key, recovering said ith file encryption key;

decrypting said ith encrypted file received at said user processor, using said recovered ith file encryption key, producing said ith multimedia file;

whereby the user processor is enabled to use said ith multimedia file.

* * * * *